(12) United States Patent
Hamada et al.

(10) Patent No.: US 8,130,428 B2
(45) Date of Patent: Mar. 6, 2012

(54) IMAGE READING APPARATUS, IMAGE FORMING APPARATUS, IMAGE READING METHOD AND COMPUTER READABLE MEDIUM STORING PROGRAM THEREOF

(75) Inventors: Eiji Hamada, Ebina (JP); Mitsuo Shimizu, Ebina (JP); Shin Kondo, Ebina (JP)

(73) Assignee: Fuji Xerox Co, Ltd., Tokyo (JP)

( * ) Notice: Subject to any disclaimer, the term of this patent is extended or adjusted under 35 U.S.C. 154(b) by 1020 days.

(21) Appl. No.: 12/053,465

(22) Filed: Mar. 21, 2008

(65) Prior Publication Data

US 2009/0074330 A1    Mar. 19, 2009

(30) Foreign Application Priority Data

Sep. 14, 2007   (JP) .................................. 2007-239183

(51) Int. Cl.
*H04N 1/46* (2006.01)
*H04N 1/00* (2006.01)

(52) U.S. Cl. ..................... 358/525; 358/500; 358/1.6

(58) Field of Classification Search ............... 358/1.6, 358/1.1, 1.15, 500, 501, 505, 506, 509, 510, 358/512, 513, 514, 515, 516, 517, 518, 525, 358/530, 540, 400, 401, 408, 474, 475, 480, 358/471, 473, 482, 483, 486, 487, 489, 491, 358/493, 494, 496, 497; 382/298, 299, 300, 382/312, 317, 318, 321; 347/2, 3, 5, 14, 347/23, 117, 225, 233, 235, 238; 399/1, 399/4; 348/246
See application file for complete search history.

(56) References Cited

U.S. PATENT DOCUMENTS

| | | | | |
|---|---|---|---|---|
| 4,774,565 A | * | 9/1988 | Freeman | 348/242 |
| 6,453,072 B1 | * | 9/2002 | Hatakenaka | 382/232 |

FOREIGN PATENT DOCUMENTS

| | | |
|---|---|---|
| JP | 09-046489 A | 2/1997 |
| JP | 2006-079318 A | 3/2006 |

* cited by examiner

*Primary Examiner* — Dov Popovici

(74) *Attorney, Agent, or Firm* — Sughrue Mion, PLLC

(57) ABSTRACT

An image reading apparatus includes: plural image pickup elements which are arranged unidirectionally, each image pickup element including plural photoelectric transducers that convert reflected light from an original document into pixel signals, and a forwarding unit that serially forwards pixel signals acquired by the photoelectric transducers; a dividing unit that divides outputs of the photoelectric transducers into plural processing paths so that pixel signals acquired by photoelectric transducers located on both sides of a boundary between adjacent image pickup elements are included in the same division unit; and an interpolation unit that executes pixel interpolation, using the pixel signals acquired by the photoelectric transducers located on both sides of the boundary among the pixel signals divided by the dividing unit.

18 Claims, 18 Drawing Sheets

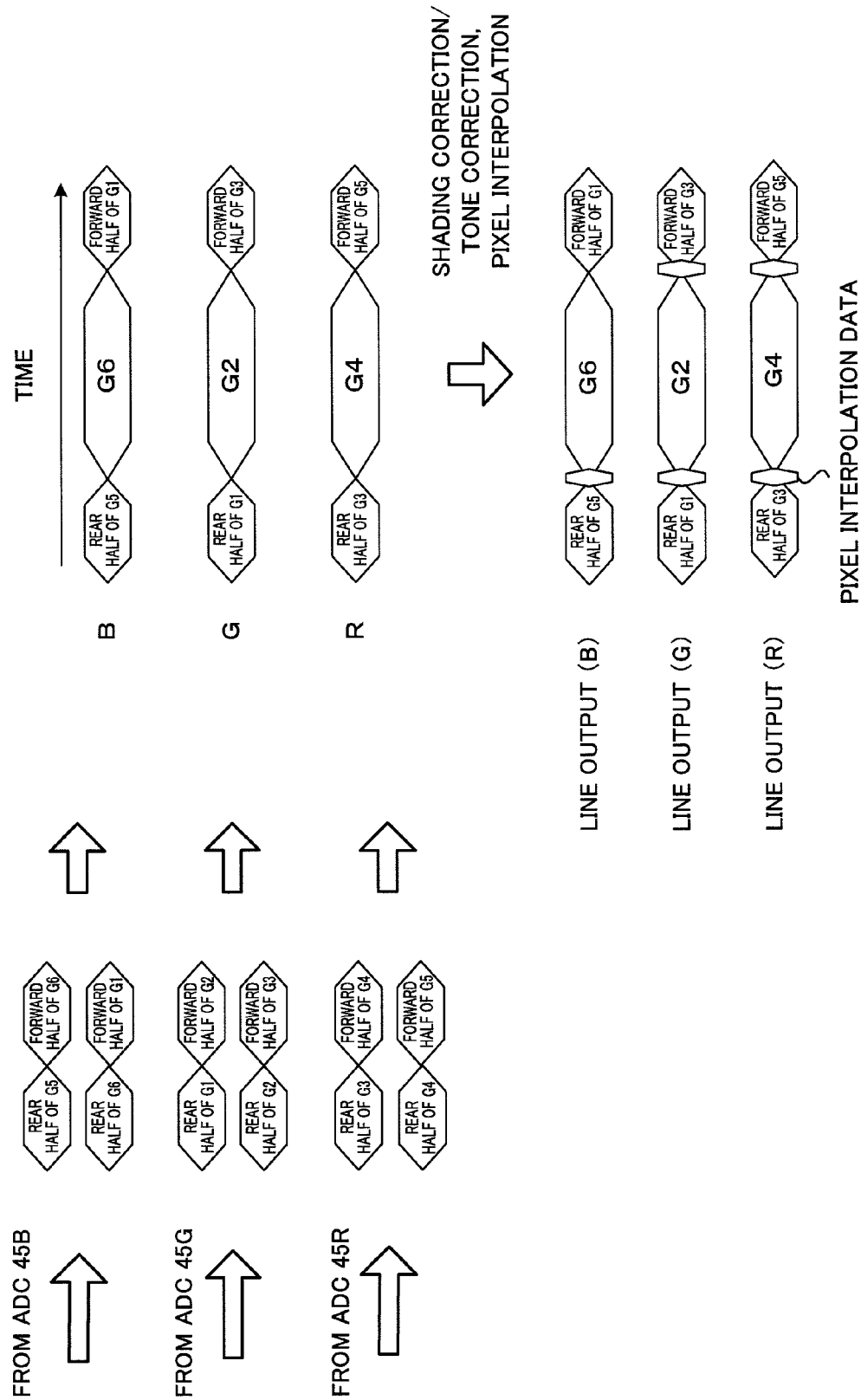

IMAGE READING APPARATUS, IMAGE FORMING APPARATUS, IMAGE READING METHOD AND COMPUTER READABLE MEDIUM STORING PROGRAM THEREOF

CROSS-REFERENCE TO RELATED APPLICATIONS

This application is based on and claims priority under 35 USC 119 from Japanese Patent Application No. 2007-239183 filed Sep. 14, 2007.

BACKGROUND

Technical Field

The present invention relates to an image reading apparatus, an image forming apparatus, an image reading method and a computer readable medium storing a program thereof.

SUMMARY

An aspect of the present invention resides in an image reading apparatus including:

plural image pickup elements which are arranged unidirectionally, each image pickup element including plural photoelectric transducers that convert reflected light from an original document into pixel signals, and a forwarding unit that serially forwards pixel signals acquired by the plural photoelectric transducers;

a dividing unit that divides outputs of the plural photoelectric transducers into plural processing paths so that pixel signals acquired by photoelectric transducers located on both sides of a boundary between adjacent image pickup elements are included in the same division unit; and an interpolation unit that executes pixel interpolation, using the pixel signals acquired by the photoelectric transducers located on both sides of the boundary among the pixel signals divided by the dividing unit.

BRIEF DESCRIPTION OF THE DRAWINGS

Exemplary embodiments of the present invention will be described in detail based on the following figures, wherein:

FIG. 19 is a diagram for explaining image data that is processed when in a monochrome reading mode in the signal processing unit 40a in the image reading apparatus of the third exemplary embodiment of the present invention.

DETAILED DESCRIPTION

Background

To help understanding of the present invention, its background and overview are first discussed.

Figure 1:
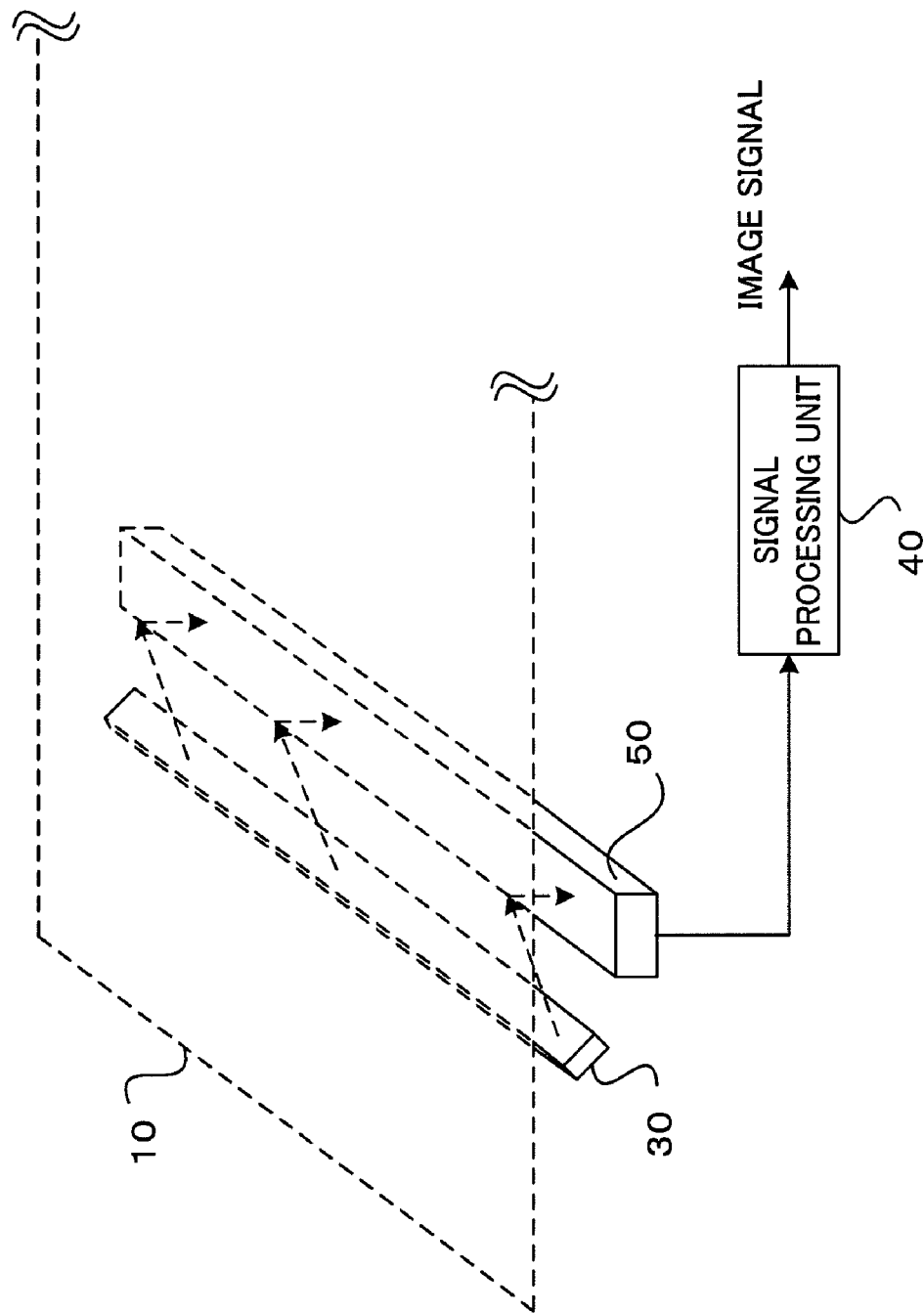
FIG. 1 illustrates a simplified structure of an image reading part of an image reading apparatus.

FIG. 1 illustrates a simplified structure of an image reading part of an image reading apparatus. In the image reading part of the image reading apparatus, an LED unit 30 and an image sensor unit 50 are provided, as shown in FIG. 1. In FIG. 1, a drive mechanism and a set of lenses and the like are omitted to simplify explanation.

The LED unit 30 is made up of plural LEDs which are disposed in line and these LEDs, as light sources, emit light that illuminates an original document 10 for reading set on the platen.

The image sensor 50 is a so-called Contact Image Sensor (CIS). This sensor is placed in proximity to the original document 10 set on the platen, converts light signals reflected by the original document 10 into image signals, and outputs the latter as image data.

The image reading part including the LED unit 30 and the image sensor 50 serially reads the image of the original document 10 set on the platen, as it moves by a drive mechanism not shown.

The image reading apparatus is also provided with a signal processing unit 40. The signal processing unit 40 performs various signal processing on image data output from the image sensor unit 50.

Figure 2:
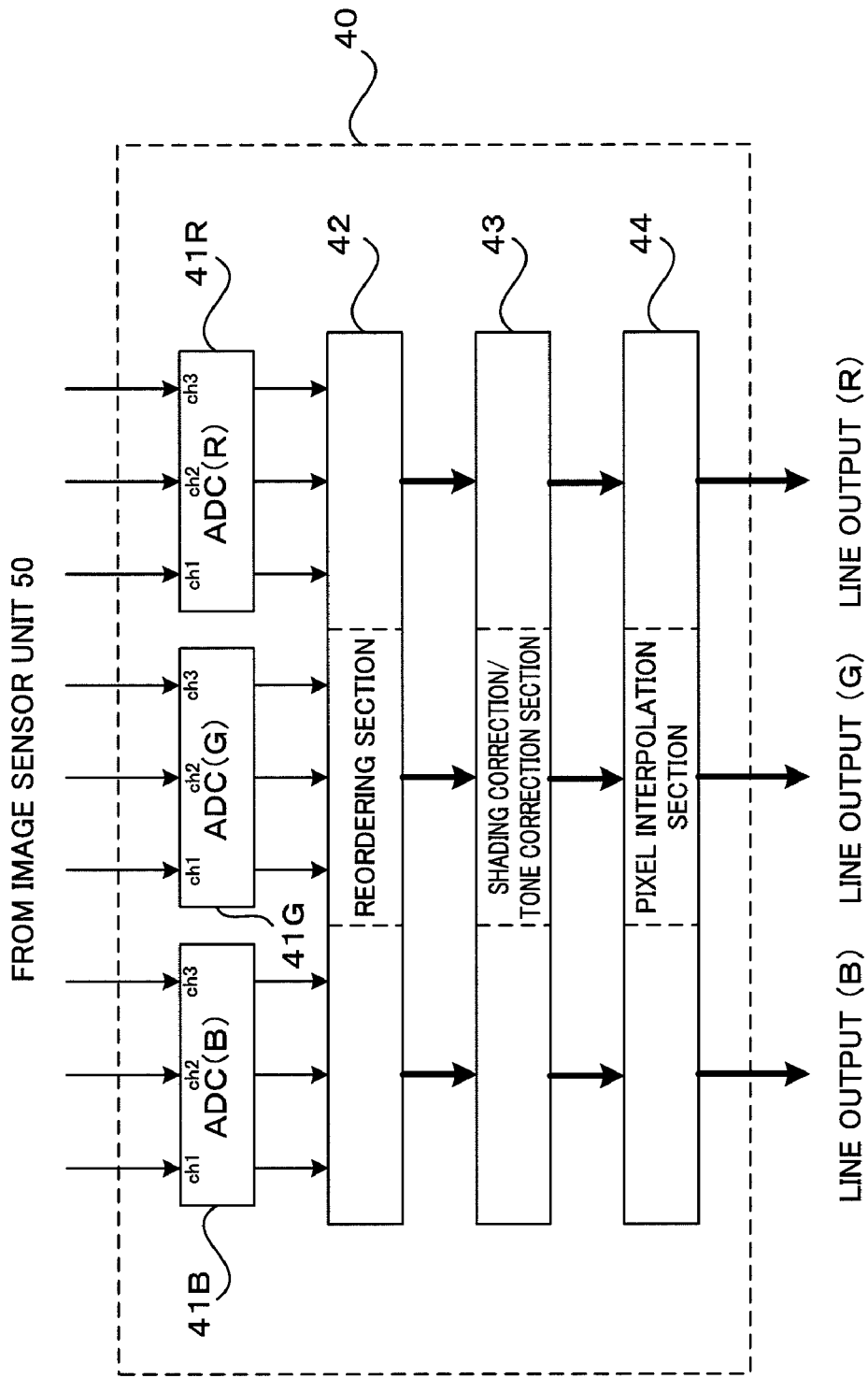
FIG. 2 is a block diagram depicting a configuration of a signal processing unit 40 in FIG. 1.

Then, the configuration of the signal processing unit 40 shown in FIG. 1 is explained with reference to FIG. 2. FIG. 2 is a block diagram depicting the configuration of the signal processing unit 40.

As shown in FIG. 2, the signal processing unit 40 is made up of A/D converters (ADCs) 41B, 41G, 41R, a reordering unit 42, a shading correction/tone correction unit 43, and a pixel interpolation unit 44.

The ADCs 41B, 41G, 41R are provided for each color of B (blue), G (green), and R (red), respectively. Each A/D converter has the input terminals for three channels (ch1 to ch3) and converts analog image data from the image sensor unit 50 into digital image data.

The reordering unit 42 performs processing of reordering digital image data input from the ADCs 41B, 41G, 41R into one sequence of image data.

The shading correction/tone correction unit 43 performs a shading correction and a tone correction on the image data reordered by the reordering unit 42.

The pixel interpolation unit 44 performs pixel interpolation processing on the image data processed by the shading correction/tone correction unit 43. The pixel interpolation processing will be described later.

Figure 3:
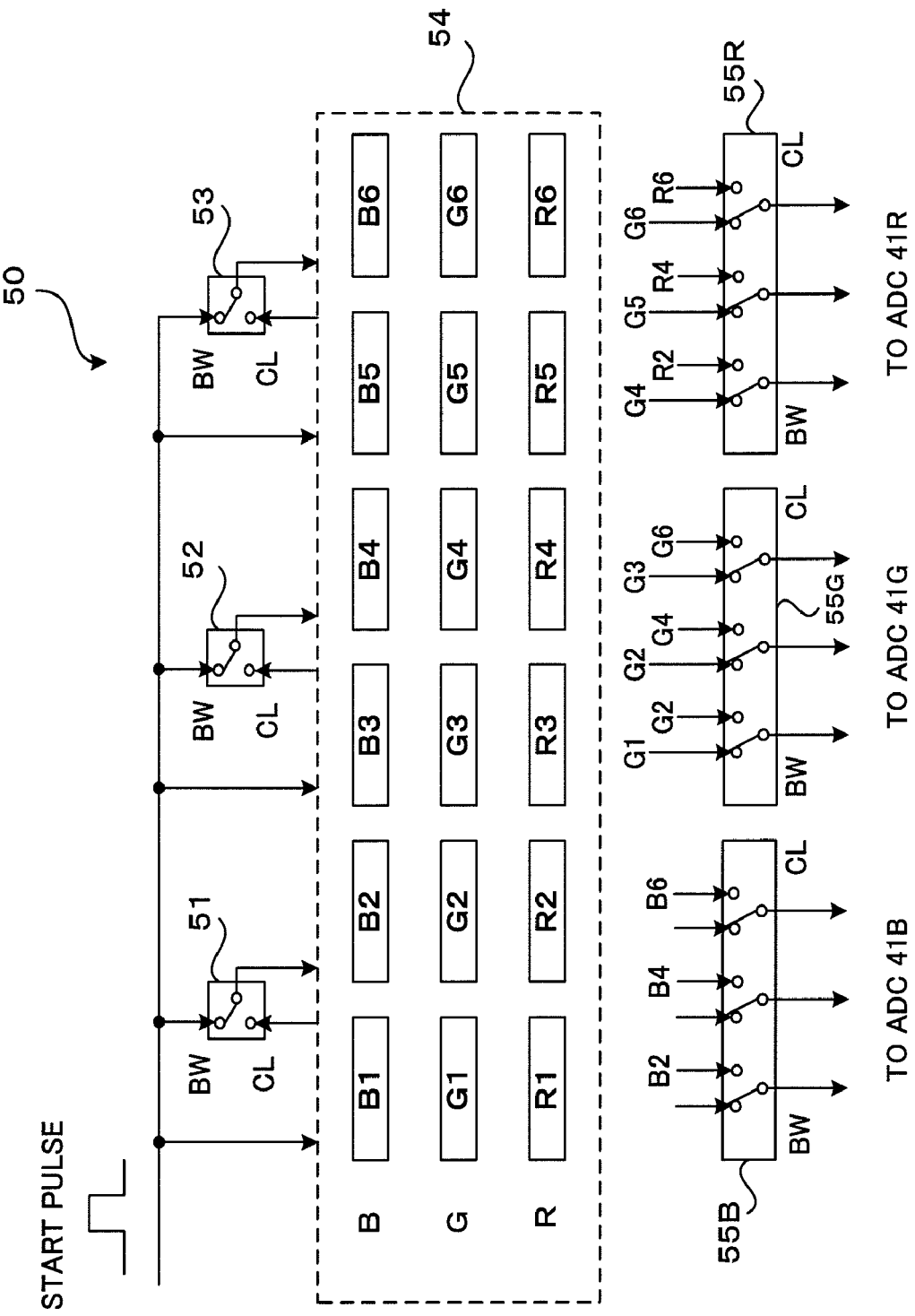
FIG. 3 is a diagram depicting a configuration of an image sensor unit 50 in FIG. 1.

Then, the configuration of the image sensor unit 50 in FIG. 1 is explained with reference to FIG. 3. As shown in FIG. 3, the image sensor unit 50 is made up of analog switches 51 to 53, line sensors 54, and analog switches 55B, 55G, 55R.

The line sensors 54 have a structure in which sensor chips (image pickup elements) B1 to B6, G1 to G6, R1 to R6, six for each color of B, G, R, are unidirectionally arranged in line, respectively. In other words, the line sensors 54 are made up of three rows of sensor chips B1 to B6, G1 to G6, R1 to R6, each row being provided for each color of B, G, R.

The analog switches 51, 52, 53 function as switching units that change the input positions of a start pulse which triggers reading of image data between a color reading mode (color reading state; CL) and a monochrome reading mode (black-and-white reading state; BW). Specifically, if the image reading apparatus is placed in the color reading mode, the start pulse is input to the top positions of the first, third, and fifth sensor chips; if in the monochrome reading mode, the start pulse is input to the top positions of all the first to sixth sensor chips. Moreover, in the color reading mode, connections are made between the first sensor chip and the second sensor chip, between the third sensor chip and the fourth sensor chip, and between the fifth sensor chip and the sixth sensor chip.

Here, the color reading mode is a reading mode in which image signals of R, G, B colors are read by using the three rows of sensor chips B1 to B6, G1 to G6, and R1 to R6. The monochrome reading mode is a reading mode in which image signals are read by using any one of the three rows of sensor chips B1 to B6, G1 to G6, and R1 to R6 (in the present exemplary embodiment, using the sensor chips G1 to G6 for reading a color of G).

The analog switches 55B, 55G, 55R function as a switching unit that changes the sensor chip outputs of image data acquired by the line sensors 54 to be output to the ADCs 41B, 41G, 41R between the color reading mode and the monochrome reading mode.

Next, the operation of the image reading apparatus described above is explained in detail with reference to the relevant drawings.

First, the operation of the image reading apparatus in the color reading mode is explained. To simplify the explanation here, the following explanation focuses on only the operation for reading a color of G (green); the operation for reading colors of B (blue) and R (red) is the same as for reading a color of G.

Figure 4:
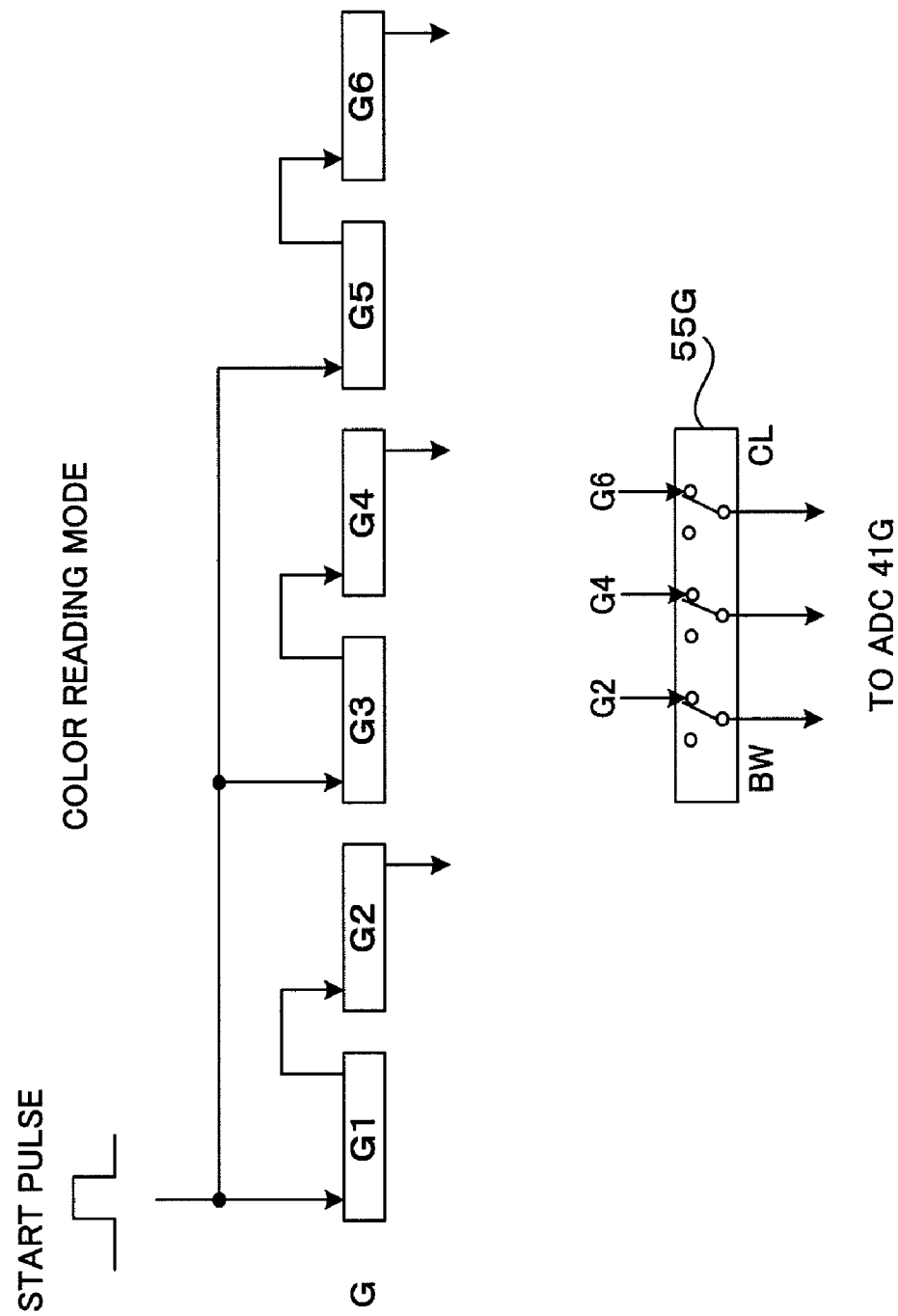
FIG. 4 is a diagram for explaining an outline of wiring when in a color reading mode within the image sensor unit 50 in a commonly-used image reading apparatus.

In the color reading mode, the analog switches 51 to 53 and 55G are placed to CL positions, which results in wiring as shown in FIG. 4. So, the start pulse is supplied to the top positions of the sensor chips G1, G3, G5 and the connections are made between the sensor chips G1 and G2, between G3 and G4, and between G5 and G6.

The analog switch 55G selects pixel signals output from the sensor chips G2, G4, G6 and supplies them to the ADC 41G. Therefore, the pixel signals output from the sensor chips G2, G4, G6 are input to the channels ch1 to ch3 of the ADC 41G.

Figure 5:
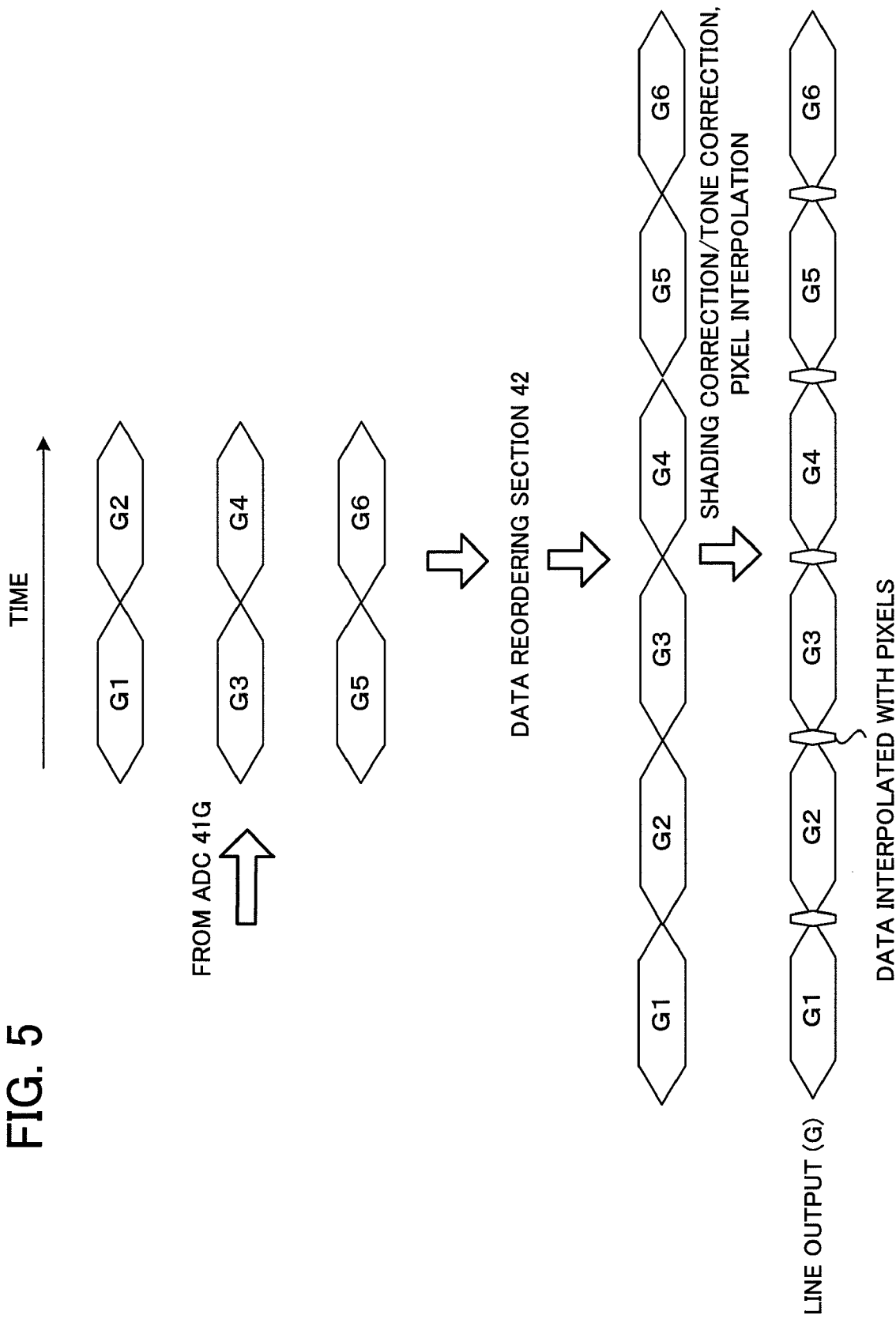
FIG. 5 is a diagram for explaining image data that is processed when in a color reading mode in the signal processing unit 40 in the commonly-used image reading apparatus.

In consequence, as is shown in FIG. 5, a signal of concatenated image data read by the sensor chips G1, G2, a signal of concatenated image data read by the sensor chips G3, G4, and a signal of concatenated image data read by the sensor chips G5, G6 are output from the ADC 41G as digital image data.

Then, the image data thus output from the ADC 41G is reordered into one sequence of image data in the reordering unit 42. The sequence of image data is subjected to the shading correction and the tone correction by the shading correction/tone correction unit 43 and then subjected to the pixel interpolation processing by the pixel interpolation unit 44. The thus processed image data is output as a line output of the color of G.

Here, the pixel interpolation processing interpolates pixels into a portion of missing pixel signals, which would occur because of gaps at the boundaries of the sensor chips, using pixel signals before and after the portion of missing pixel signals.

In an image reading apparatus configured with multi-chip sensing devices, wherein one line is made up of plural sensor chips, gaps are physically produced between the sensor chips. For example, in the line sensors 54 shown in FIG. 3, a physical gap is produced between the sensor chips G1 and G2 and pixel signals in the corresponding portion are missing.

Hence, the pixel interpolation unit 44 interpolates pixels into the missing portion of pixel signals occurred between the sensor chips, based on the pixel signals before and after this missing portion.

In this way, the portions of missing pixels in the boundaries of the sensor chips G1 to G6 are interpolated and image data including pixel interpolation data is acquired as the line output, as shown in FIG. 5.

Like this example, in the case where an image read by using multi-chip line sensors in which one line is made up of six sensor chips and the A/D converters provided for each color have only three channels, one channel of each A/D converter is assigned for A/D conversion of pixel signals from two sensor chips.

Next, the operation of the image reading apparatus in the monochrome reading mode is explained. In the following description, image pickup is assumed to be performed by using one of three line sensors for B, G, R colors, the line sensor for the color of G to read a monochrome image.

In the color reading mode, six sensor chips constitute one line per color, but each A/D converter has only three input channels; therefore, one channel is used for A/D conversion of pixel signals from two sensor chips. However, in the monochrome reading mode, only one of the line sensors provided for a total of three lines for three colors of B, G, and R is used.

Hence, in the monochrome reading mode, when image reading for one line is performed by six sensor chips, faster reading is accomplished by using two A/D converters having three channels. The time taken for image reading for one line is reduced by half than in the color reading mode.

Figure 6:
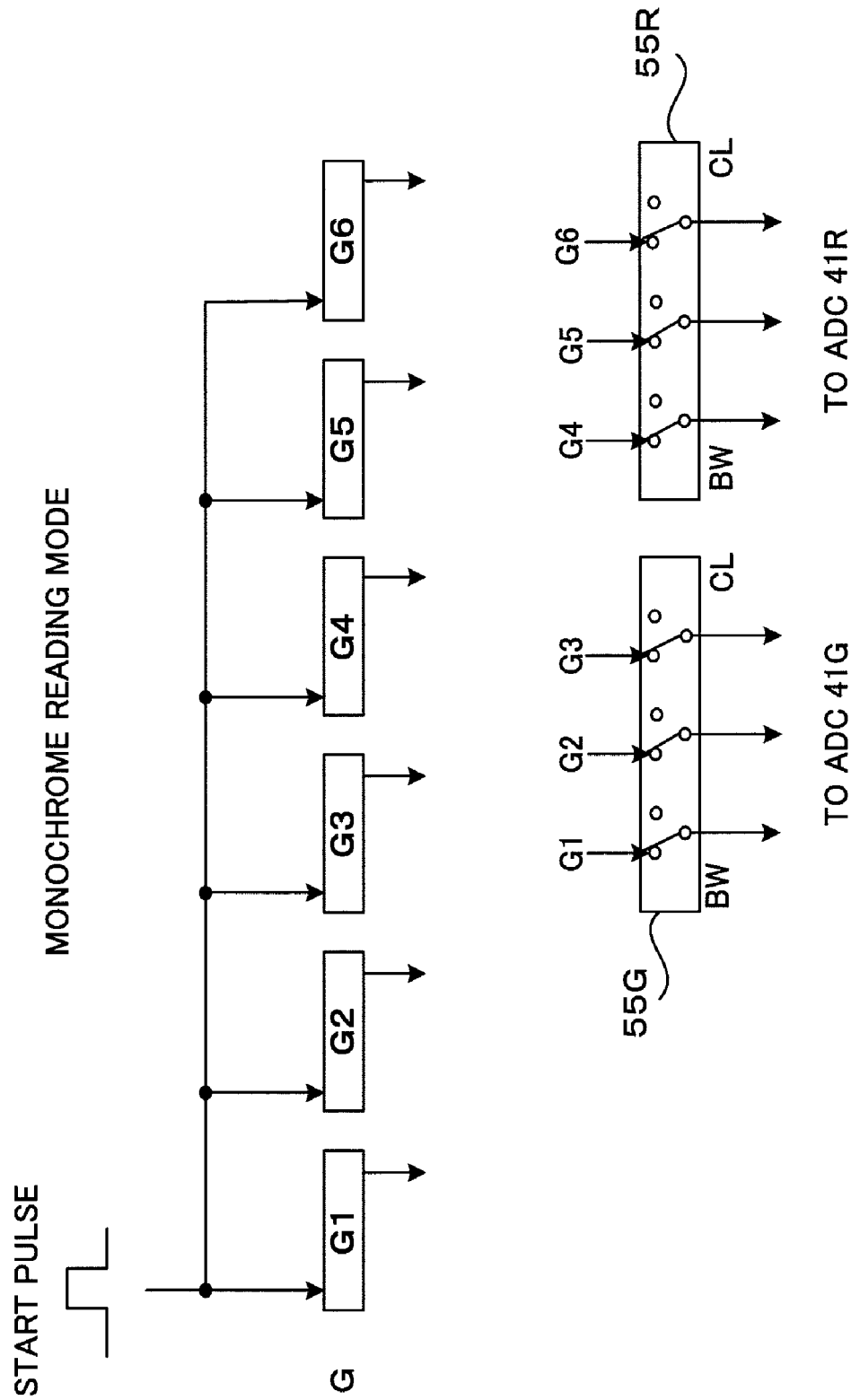
FIG. 6 is a diagram for explaining an outline of wiring when in a monochrome reading mode within the image sensor unit 50 in the commonly-used image reading apparatus.

In the monochrome reading mode, the analog switches 51 to 53, 55G, and 55R are placed to BW (monochrome reading mode) positions, which results in wiring as shown in FIG. 6.

So, the start pulse is supplied to the top positions of all sensor chips G1 to G6. Image signals output from the tails of the sensor chips G1 to G6 are output via analog switches 55G, 55R to the input channels of the ADCs 41G and 41R, respectively.

Like this, there is one-to-one correspondence between the number of sensor chips and the number of the channels of the A/D converters in the monochrome reading mode. Therefore, each channel of the A/D converters can be assigned for A/D conversion of pixel signals from one sensor chip only.

Figure 7:
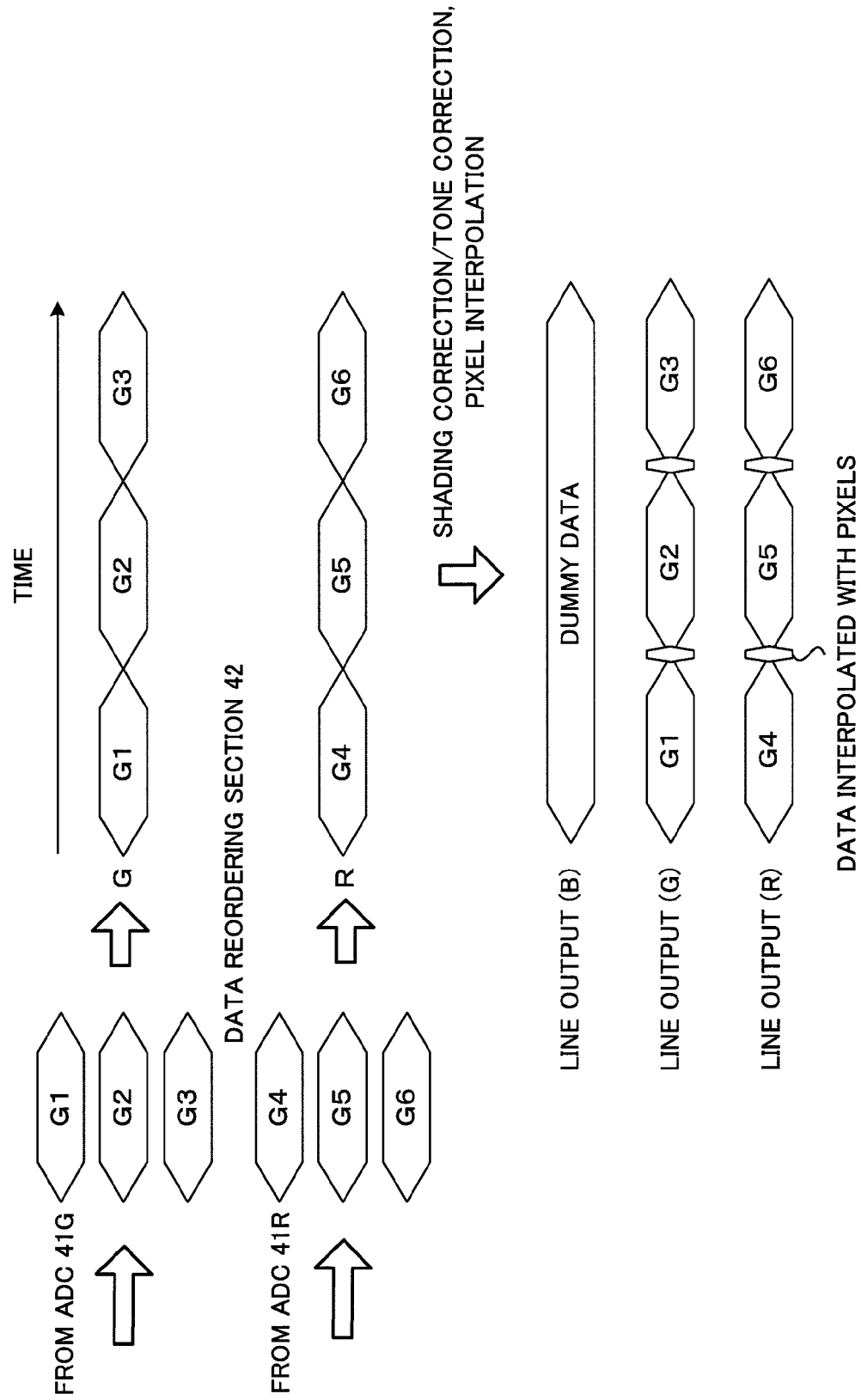
FIG. 7 is a diagram for explaining image data that is processed when in a monochrome reading mode in the signal processing unit 40 in the commonly-used image reading apparatus.

In consequence, pixel signals read by the sensor chips G1, G2, G3 are output from the ADC 41G as digital image data and pixel signals read by the sensor chips G4, G5, G6 are output from the ADC 41R as digital image data, as is shown in FIG. 7. The image data output from the ADC 41G and the image data output from the ADC 41R are subjected to reordering, shading correction, tone correction, and pixel interpolation in separate paths and output as the line output (G) and the line output (R), respectively.

In the monochrome reading mode as described above, when image reading for one line is performed by six sensor chips, faster reading is accomplished by using two A/D converters having three channels, wherein the time taken for image reading for one line is reduced by half than in the color reading mode.

However, as shown in FIG. 7, the image data of concatenated pixel signals from the sensor chips G1, G2, G3 and the image data of concatenated pixel signals from the sensor chips G4, G5, G6 are signal processed in separate paths.

Consequently, this poses a problem that pixel interpolation cannot be performed between the pixel signals from the sensor chip G3 and the pixel signals from the sensor chip G4.

EXEMPLARY EMBODIMENTS

Exemplary embodiments of the present invention will now be described in detail with reference to the relevant drawings.

First Exemplary Embodiment

Figure 8:
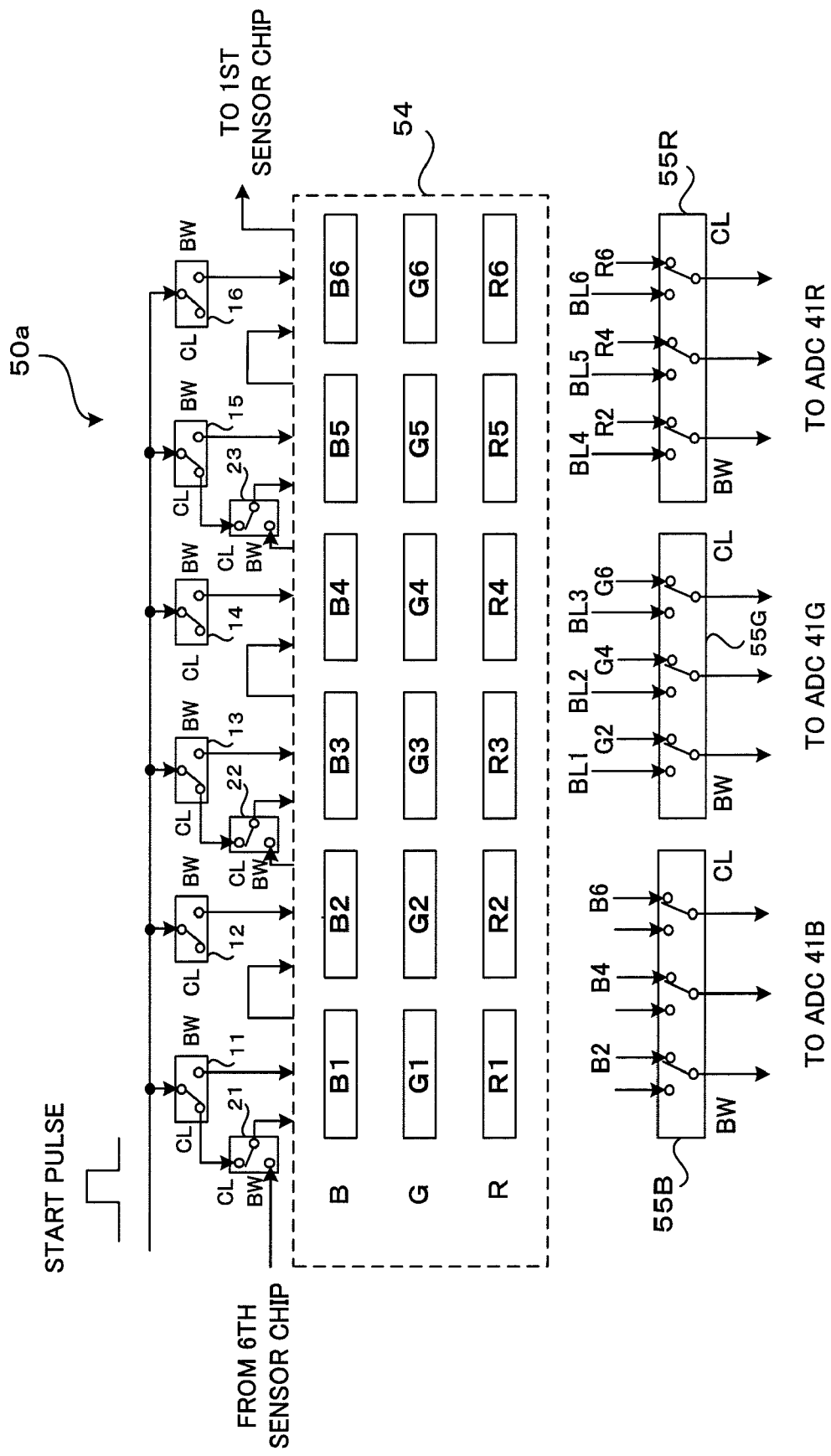
FIG. 8 is a diagram depicting a configuration of an image sensor unit 50a in an image reading apparatus of a first exemplary embodiment of the present invention.

An image reading apparatus of a first exemplary embodiment of the present invention is configured with an image sensor unit 50a which is shown in FIG. 8, superseding the image sensor unit 50 in a commonly-used image reading apparatus as described above.

As shown in FIG. 8, the image sensor unit 50a in the present exemplary embodiment is made up of analog switches 11 to 16, analog switches 21 to 23, line sensors 54, and analog switches 55B, 55G, 55R. In FIG. 8, components corresponding to those shown in FIG. 3 are assigned the same reference labels and their explanation is not repeated.

The analog switches 11 to 16 change the input positions of the start pulse which triggers reading of image data between the color reading mode (CL) and the monochrome reading mode (BW). Specifically, if the image reading apparatus is placed in the color reading mode, the start pulse is input to the top positions of the first, third, and fifth sensor chips; if in the monochrome reading mode, the start pulse is input to the center positions of all the first to sixth sensor chips.

Moreover, in the monochrome reading mode, the analog switches 21 to 23 make connections between the sixth sensor chip and the first sensor chip, between the second sensor chip and the third sensor chip, and between the fourth sensor chip and the fifth sensor chip.

Whether the color reading mode or the monochrome reading mode, connections are made between the first sensor chip and the second sensor chip, between the third sensor chip and the fourth sensor chip, and between the fifth sensor chip and the sixth sensor chip.

To the analog switches 55g, 55R in the image reading apparatus of the present exemplary embodiment, signals labeled BL1 to BL6 (BL: block) are input as inputs that are selected when in the monochrome reading mode. These signals indicate pixel signals from which parts of sensor chips, which will be described later.

Figure 9:
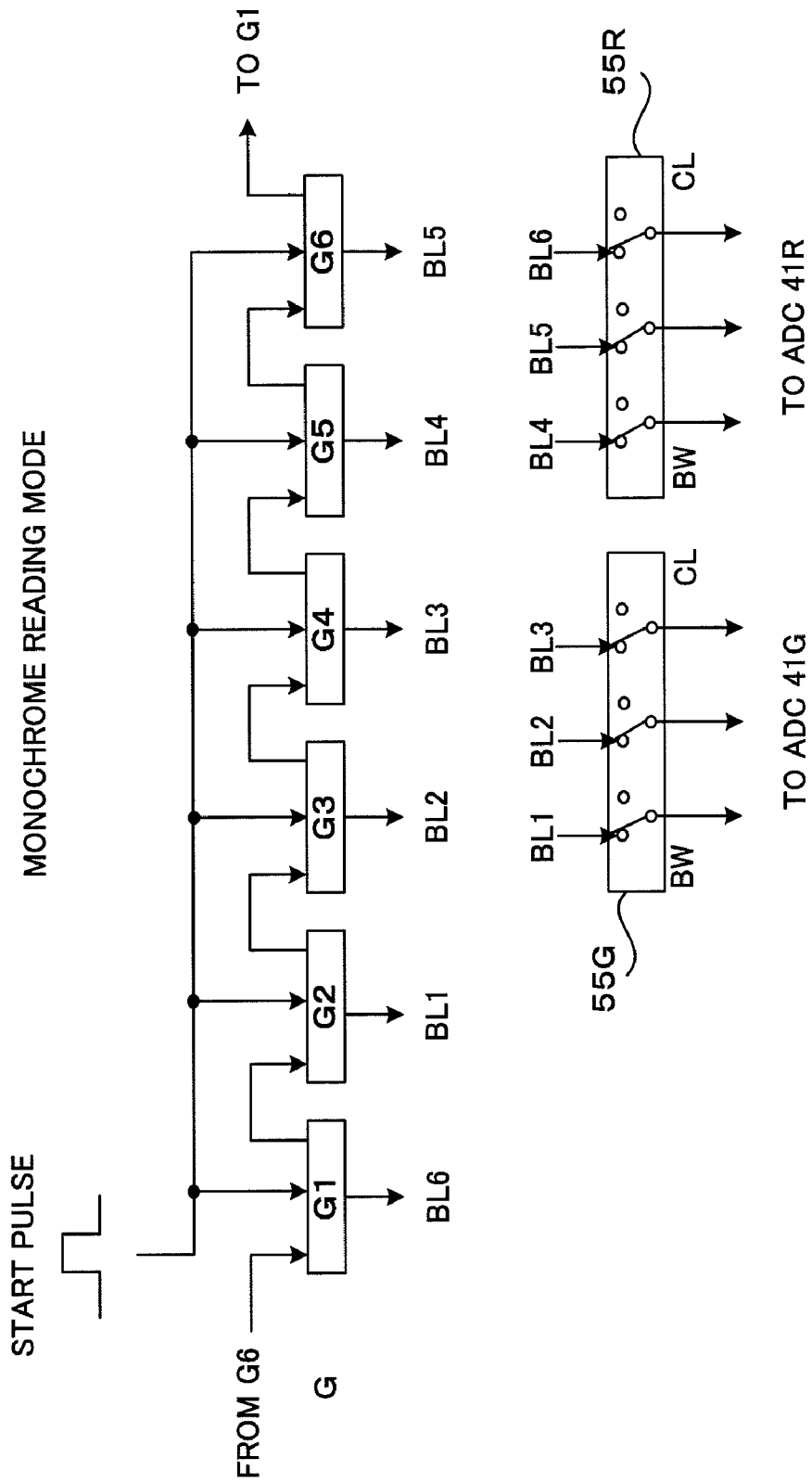
FIG. 9 is a diagram for explaining an outline of wiring when in a monochrome reading mode within the image sensor unit 50a in the image reading apparatus of the first exemplary embodiment of the present invention.

Owing to this configuration, when the image reading apparatus of the present exemplary embodiment is placed in the monochrome reading mode, the analog switches 11 to 16, 55G, and 55R are placed to BW positions, which results in wiring as shown in FIG. 9.

So, the start pulse is supplied to the center positions of the sensor chips G1 to G6 and the tail of each of the sensor chips G1 to G6 is connected to the top position of the next sensor chip. Because there is no sensor chip next to, i.e., to the right of the sensor chip G6, the tail of the sensor chip G6 is connected to the top position of the sensor chip G1. Output terminals are set up in the center positions of the sensor chips G1 to G6. Pixel signals taken from the center positions of the sensor chips G1 to G6 are output via the analog switches 55G, 55R to the input channels of the ADCs 41G and 41R.

Hence, the rear half of the sensor chip G1 and the forward half of the sensor chip G2 are handled as one block (BL1), and the rear half of the sensor chip G2 and the forward half of the sensor chip G3 are handled as one block (BL2). For subsequent chips, similarly, the forward half of the n-th sensor chip and the rear half of the next, (n+1)th sensor chip are handled as one block.

Outputs BL1 to BL3 from the first to third blocks are connected to the input channels (ch1 to ch3) of the ADC 41G and outputs BL4 to BL6 from the fourth to sixth blocks are connected to the input channels (ch4 to ch6) of the ADC 41R.

Figure 10:
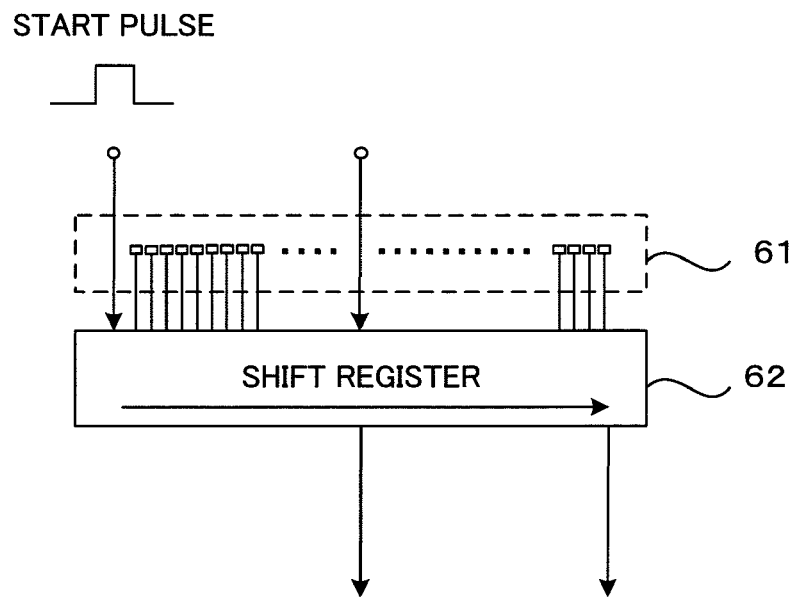
FIG. 10 is a diagram depicting a structure of each of sensor chips which constitute line sensors 54.

A structure of each of the sensor chips which constitute the line sensors 54 is depicted in FIG. 10. As shown in FIG. 10, a sensor chip is made up of plural photoelectric transducers 61 which convert reflected light from an original document 10 set on the platen into pixel signals and a shift register 62 which functions as a forwarding unit that serially forwards pixel signals acquired by the plural photoelectric transducers 61.

In the shift register 62, the pixel signals acquired by the photoelectric transducers 61 are serially forwarded from the start pulse input position and output in order from the pixel signal acquired by the photoelectric transducer in the output terminal setup position.

Figure 11:
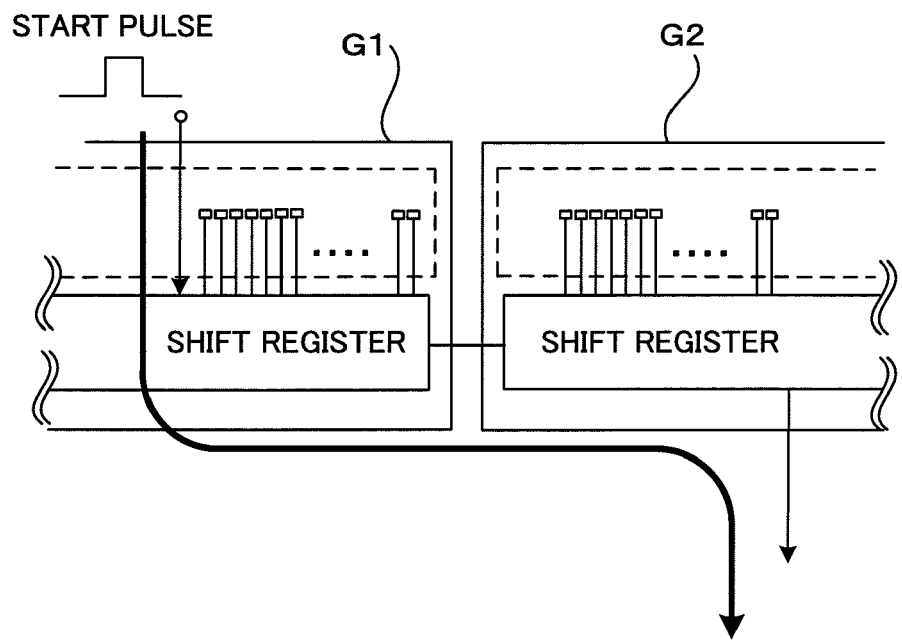
FIG. 11 is a diagram for explaining division of each sensor chip constituting the line sensors 54 into two parts, forward and read with regard to its center.

Then, division of each sensor into two parts, forward and rear with regard to its center, is explained in detail with reference to FIG. 11. In FIG. 11, two sensor chips G1 and G2 are used for explanation.

In the image reading apparatus in the present exemplary embodiment, the start pulse is input at the center of each sensor chip and an output terminal is set up at the center of each sensor chip. Therefore, as is illustrated in FIG. 11, the pixel signals acquired by the photoelectric transducers in the rear half of the sensor chip G1 and the pixel signals acquired by the photoelectric transducers in the forward half of the sensor chip G2 are serially output from the output terminal provided at the center of the sensor chip G2.

Figure 12:
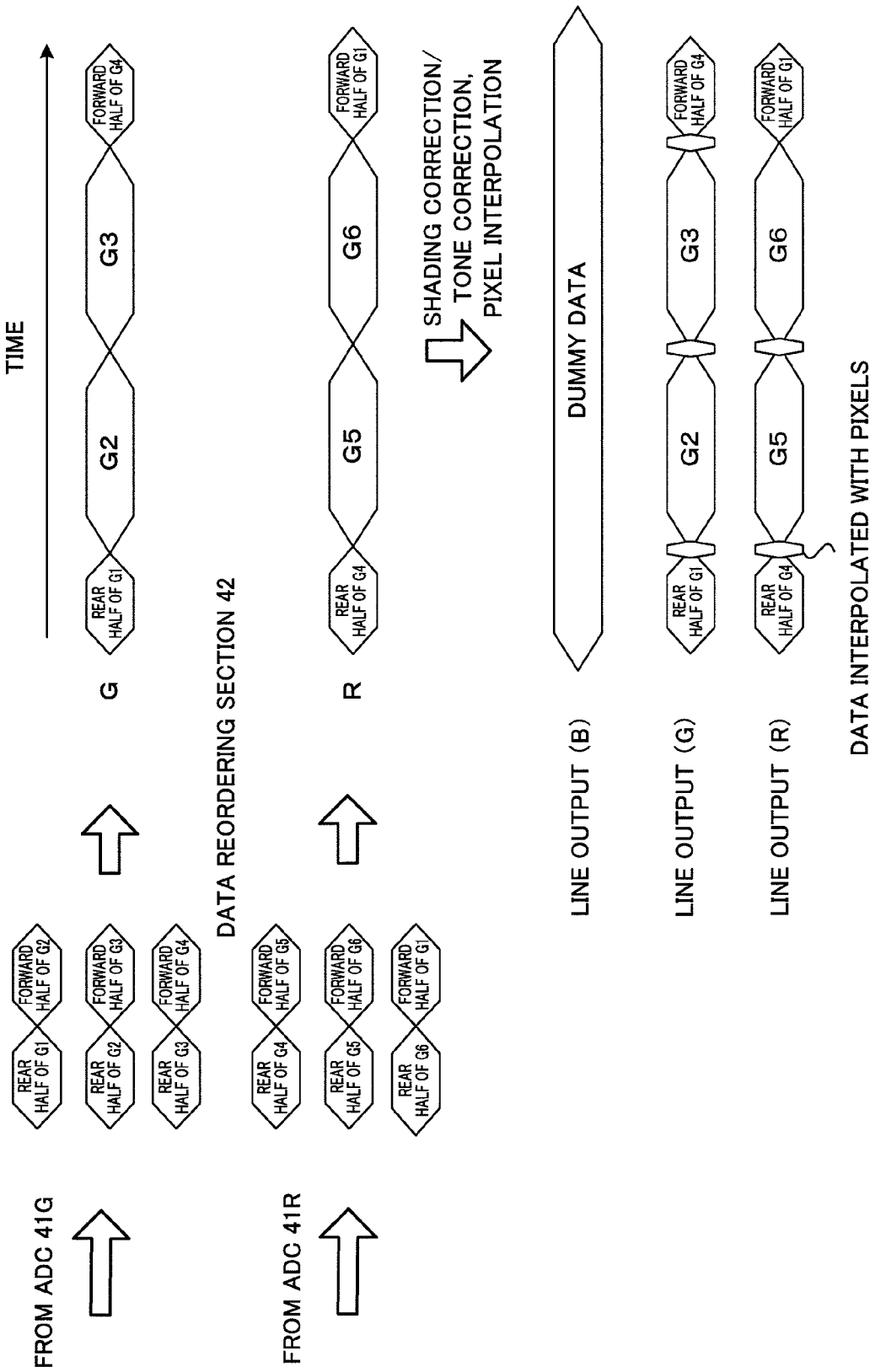
FIG. 12 is a diagram for explaining image data that is processed when in a monochrome reading mode in the signal processing unit 40 in the image reading apparatus of the first exemplary embodiment of the present invention.

This operation is performed by the sensor chips G1 to G6, with the result that a concatenation of the pixel signals acquired by the photoelectric transducers in the rear half of the sensor chip G1 and the pixel signals acquired by the photoelectric transducers in the forward half of the sensor chip G2 is A/D converted in the first channel of the ADC 41G, as is illustrated in FIG. 12. A concatenation of the pixel signals acquired by the photoelectric transducers in the rear half of the sensor chip G2 and the pixel signals acquired by the photoelectric transducers in the forward half of the sensor chip G3 is A/D converted in the second channel of the ADC 41G. Further, a concatenation of the pixel signals acquired by the photoelectric transducers in the rear half of the sensor chip G3 and the pixel signals acquired by the photoelectric transducers in the forward half of the sensor chip G4 is A/D converted in the first channel of the ADC 41G.

Similarly, in each channel of the ADC 41R, a concatenation of the pixel signals from the rear half of the sensor chip G4 and the pixel signals from the forward half of the sensor chip G5, a concatenation of the pixel signals from the rear half of the sensor chip G5 and the pixel signals from the forward half of the sensor chip G6, and a concatenation of the pixel signals from the rear half of the sensor chip G6 and the pixel signals from the forward half of the sensor chip G1 are A/D converted, respectively.

These signals are reordered into image data by the data reordering unit 42. The resulting image data in the G color signal processing path is a concatenation of the pixel signals from the rear half of the sensor chip G1, the pixel signals from the sensor chip G2, the pixel signals from the sensor chip G3, and the pixel signals from the forward half of the sensor chip G4.

The resulting image data in the R color signal processing path is a concatenation of the pixel signals from the rear half of the sensor chip G4, the pixel signals from the sensor chip G5, the pixel signals from the sensor chip G6, and the pixel signals from the forward half of the sensor chip G1.

The pixel interpolation unit 44 performs pixel interpolation on these two image data pieces. Thus, in the G color signal processing path, pixels are interpolated between the pixel signals from the rear half of G1 and the pixel signals from G2, between the pixel signals from G2 and the pixel signals from G3, and between the pixel signals from G3 and the pixel signals from the forward half of G4. In the R color signal processing path, pixels are interpolated between the pixel signals from the rear half of G4 and the pixel signals from G5 and between the pixel signals from G5 and the pixel signals from G6.

In this way, in the image reading apparatus of the present exemplary embodiment, a dividing unit is constituted by the analog switches 11 to 16, 21 to 23, 55G, 55R, and their peripheral circuits. The dividing unit divides the outputs of the plural photoelectric transducers into plural processing paths so that the pixel signals acquired by the photoelectric transducers located on both sides of a boundary between adjacent sensor chips are included in the same division unit.

Hence, this dividing unit divides the outputs of the plural photoelectric transducers into two processing paths so that the pixel signals for at least one pixel from the photoelectric transducers located on both sides of each boundary between adjacent chips of the six sensor chips are included in a block to enable pixel interpolation in later signal processing.

In the image reading apparatus of the present exemplary embodiment, in particular, this dividing unit divides the outputs of plural photoelectric transducers of each of the sensor chips G1 to G6 into two parts, forward and rear with regard to the center of the chip; i.e., it divides the outputs of the plural photoelectric transducers so that the photoelectric transducers in the rear half of a sensor chip and the photoelectric transducers in the forward half of the next sensor chip are grouped into the same processing block.

The signal processing unit 40 in the image reading apparatus of the present exemplary embodiment performs A/D conversion and other several steps of signal processing separately for each group of the pixel signals divided into two processing paths by the dividing unit. So, the signal processing unit 40 is composed of plural processing subunits which perform signal processing separately for each group of image data in two processing paths, divided by the dividing unit. In the signal processing unit 40, after the reordering unit 42, several steps of signal processing are performed for each processing path for each color of B, G, and R.

Consequently, the pixel signals acquired on both sides of all boundaries between adjacent chips of the sensor chips G1 to G6 are included in one of signal processing paths, two separate paths of G and R colors, as illustrated in FIG. 12.

After image data is processed through the steps of signal processing such as A/D conversion, shading correction, and tone correction, performed by the plural signal processing subunits, the pixel interpolation unit 44 interpolates pixels into a portion of missing pixel signals in the image data, which would occur because of gaps at the boundaries of the sensor chips G1 to G6. In particular, the pixel interpolation unit 44 performs pixel interpolation, using image data acquired by the photoelectric transducers located on both sides of each boundary between adjacent chips of the sensor chips G1 to G6 in the image data divided by the dividing unit. Thus, the pixel interpolation unit 44 interpolates the gaps with pixels at all boundaries between adjacent chips of the sensor chips G1 to G6.

In the image reading apparatus of the present exemplary embodiment, hence, even when, after the apparatus is switched to the monochrome reading mode, the steps of signal processing are performed by the signal processing unit 40 through two separate processing paths via the ADC 41G for G color processing and the ADC 41 R for R color processing, the pixel interpolation unit 44 interpolates the gaps with pixels at all boundaries between adjacent chips of the sensor chips G1 to G6.

Second Exemplary Embodiment

Next, an image reading apparatus of a second exemplary embodiment of the present invention is described.

Figure 13:
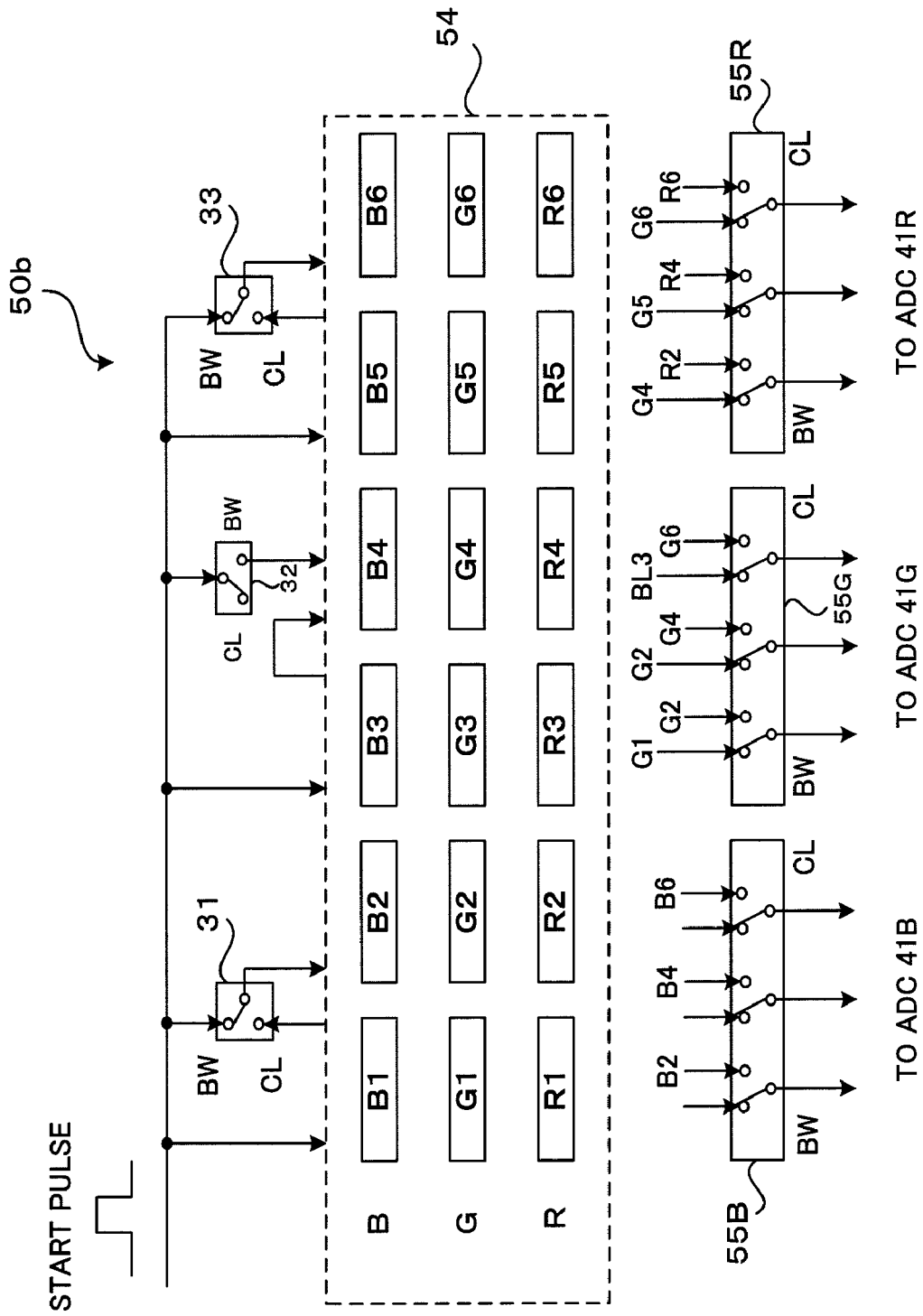
FIG. 13 is a diagram depicting a configuration of an image sensor unit 50b in an image reading apparatus of a second exemplary embodiment of the present invention.

The image reading apparatus of the second exemplary embodiment of the present invention is configured with an image sensor unit 50b which is shown in FIG. 13, superseding the image sensor unit 50 in the commonly-used image reading apparatus as described already.

As shown in FIG. 13, the image sensor unit 50b in the present exemplary embodiment is made up of analog switches 31 to 33, line sensors 54, and analog switches 55B, 55G, 55R. In FIG. 13, components corresponding to those shown in FIG. 3 are assigned the same reference labels and their explanation is not repeated.

In the monochrome reading mode, the analog switches 31, 33 supply the start pulse to the top positions of the second and sixth sensor chips, respectively. In the color reading mode, these switches make connections between the first and second sensor chips and between the fifth and sixth sensor chips.

In the monochrome reading mode, the analog switch 32 supplies the start pulse to the center position of the fourth sensor chip.

Figure 14:
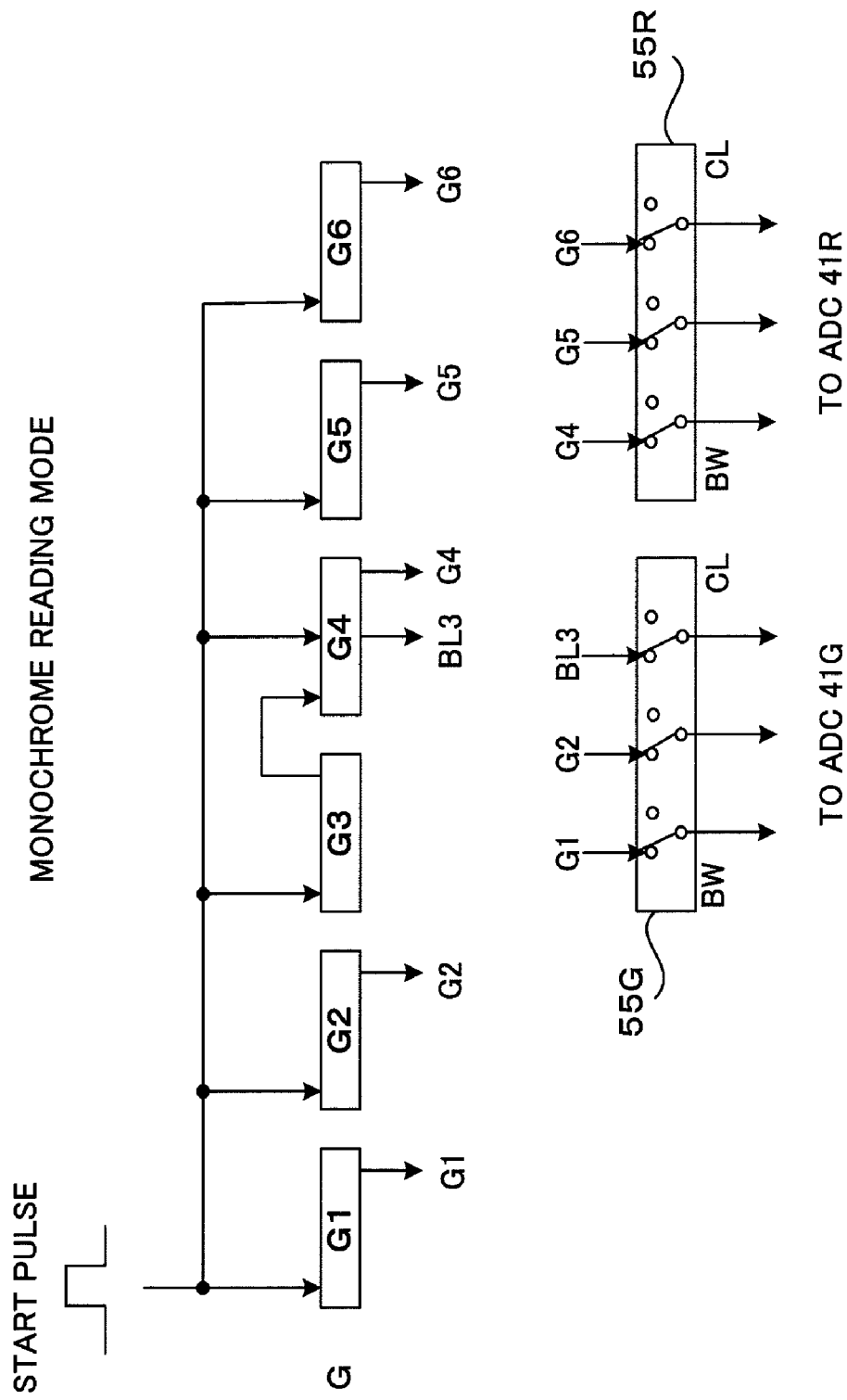
FIG. 14 is a diagram for explaining an outline of wiring when in a monochrome reading mode within the image sensor unit 50b in the image reading apparatus of the second exemplary embodiment of the present invention.

Owing to this configuration, when the image reading apparatus of the present exemplary embodiment is placed in the monochrome reading mode, the analog switches 31 to 33, 55G, and 55R are placed to BW positions, which results in wiring as shown in FIG. 14.

So, the start pulse is supplied to the top positions of the sensor chips G1, G2, G3, G5, G6 and the center position of the sensor chip G4 and the tail of the sensor chip G3 is connected to the top position of the next sensor chip G4. The sensor chips G1, G2, G4, G5, and G6 has output terminals set up at their tails. The sensor chip G4 has an output terminal labeled BL3 set up in the center position.

Pixels signals from the sensor chips G1, G2 and pixel signals output from the BL3 are output via the analog switch 55G to the input channels (ch1 to ch3) of the ADC 41G. Pixel signals from the sensor chips G4, G5, G6 are output via the analog switch 55R to the input channels (ch1 to ch3) of the ADC 41R.

Figure 15:
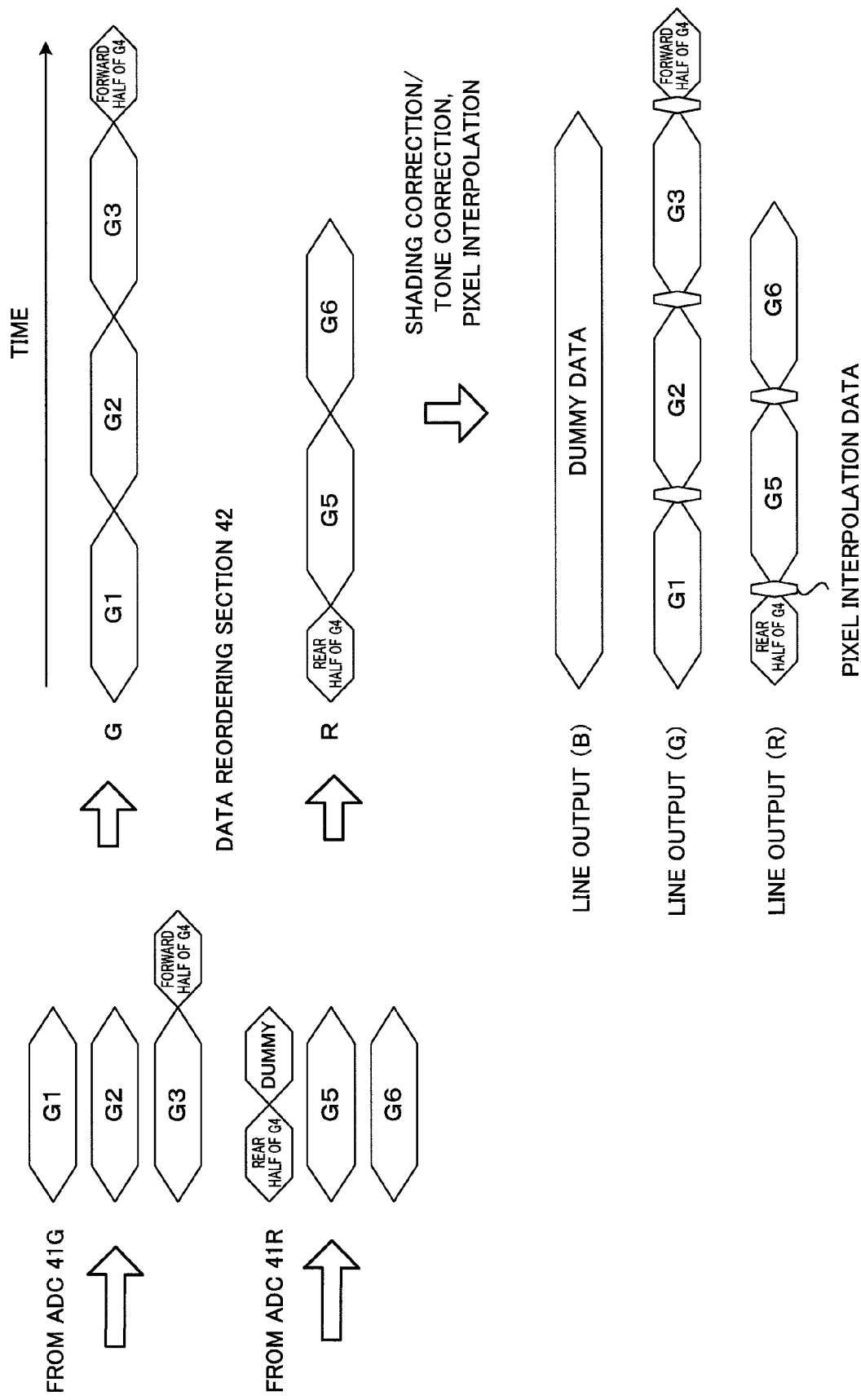
FIG. 15 is a diagram for explaining image data that is processed when in a monochrome reading mode in the signal processing unit 40 in the image reading apparatus of the second exemplary embodiment of the present invention.

In consequence, as is illustrated in FIG. 15, the pixel signals from the sensor chips G1, G2 are output from the first and second channels of the ADC 41G and the pixel signals from the sensor chip G3 and a concatenation of the pixel signals acquired by photoelectric transducers in the forward half of the sensor chip G4 are output from the third channel of the ADC 41G.

The pixel signals acquired by photoelectric transducers in the rear half of sensor chip G4 are output from the first channel of the ADC 41R and the pixel signals from the sensor chips G5, G6 are output from the second and third channels of the ADC 41R.

These signals are reordered into image data by the data reordering unit 42. The resulting image data in the G color signal processing path is a concatenation of the pixel signals from the sensor chip G1, the pixel signals from the sensor chip G2, the pixel signals from the sensor chip G3, and the pixel signals from the forward half of the sensor chip G4.

The resulting image data in the R color signal processing path is a concatenation of the pixel signals in the rear half of the sensor chip G4, the pixel signals from the sensor chip G5, and the pixel signals from the sensor chip G6.

The pixel interpolation unit 44 performs pixel interpolation on these two image data. Thus, in the G color signal processing path, pixels are interpolated between the pixel signals from G1 and the pixel signals from G2, between the pixel signals from G2 and the pixel signals from G3, and between the pixel signals from G3 and the pixel signals from the forward half of G4. In the R color signal processing path, pixels are interpolated between the pixel signals from the rear half of G4 and the pixel signals from G5 and between the pixel signals from G5 and the pixel signals from G6.

In the image reading apparatus of the present exemplary embodiment, only the chip sensor G4 is a chip sensor in which photoelectric transducers have to be divided into two parts at the center. Therefore, the number of analog switches can be made fewer than and the circuit configuration can be made simpler than the image reading apparatus of the first exemplary embodiment.

In the image reading apparatus of the present exemplary embodiment, however, because of longer image data in the line output (G), the image reading speed is somewhat lower than image reading apparatus of the first exemplary embodiment. However, in the present exemplary embodiment also, the image reading speed in the monochrome reading mode is sufficiently faster than the speed in the color reading mode.

Third Exemplary Embodiment

Next, an image reading apparatus of a third exemplary embodiment is described.

The foregoing first and second image reading apparatuses are configured such that the line sensors are made up of six chips per line and the A/D converters have three channels for each color of B, G, and R. On the other hand, the image reading apparatus of the present exemplary embodiment is an example of application of the present invention to another configuration in which the line sensors are made up of six chips per line and the A/D converters have two channels for each color of B, G, and R.

Figure 16:
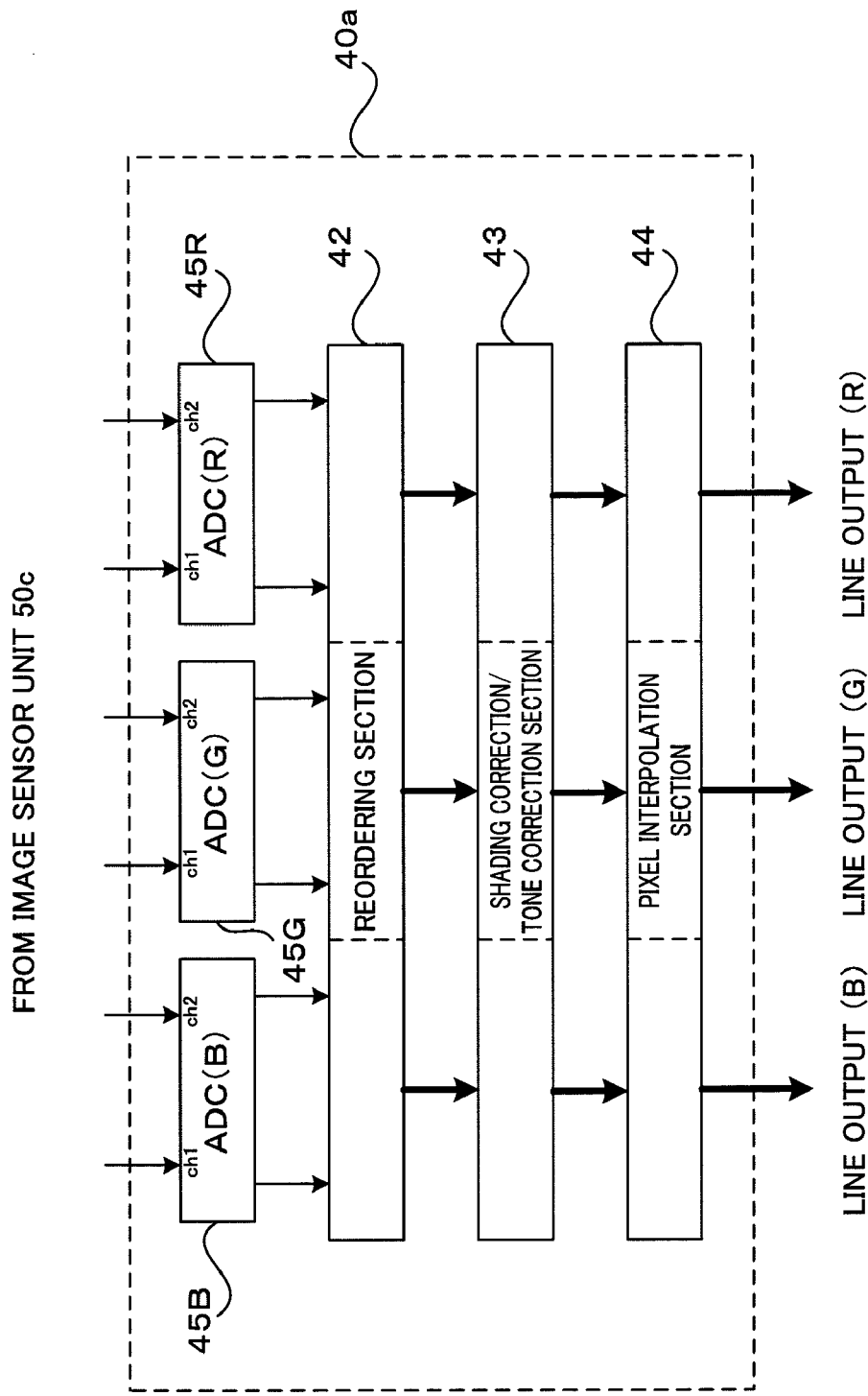
FIG. 16 is a diagram depicting a configuration of a signal processing unit 40a in an image reading apparatus of a third exemplary embodiment of the present invention.
Figure 17:
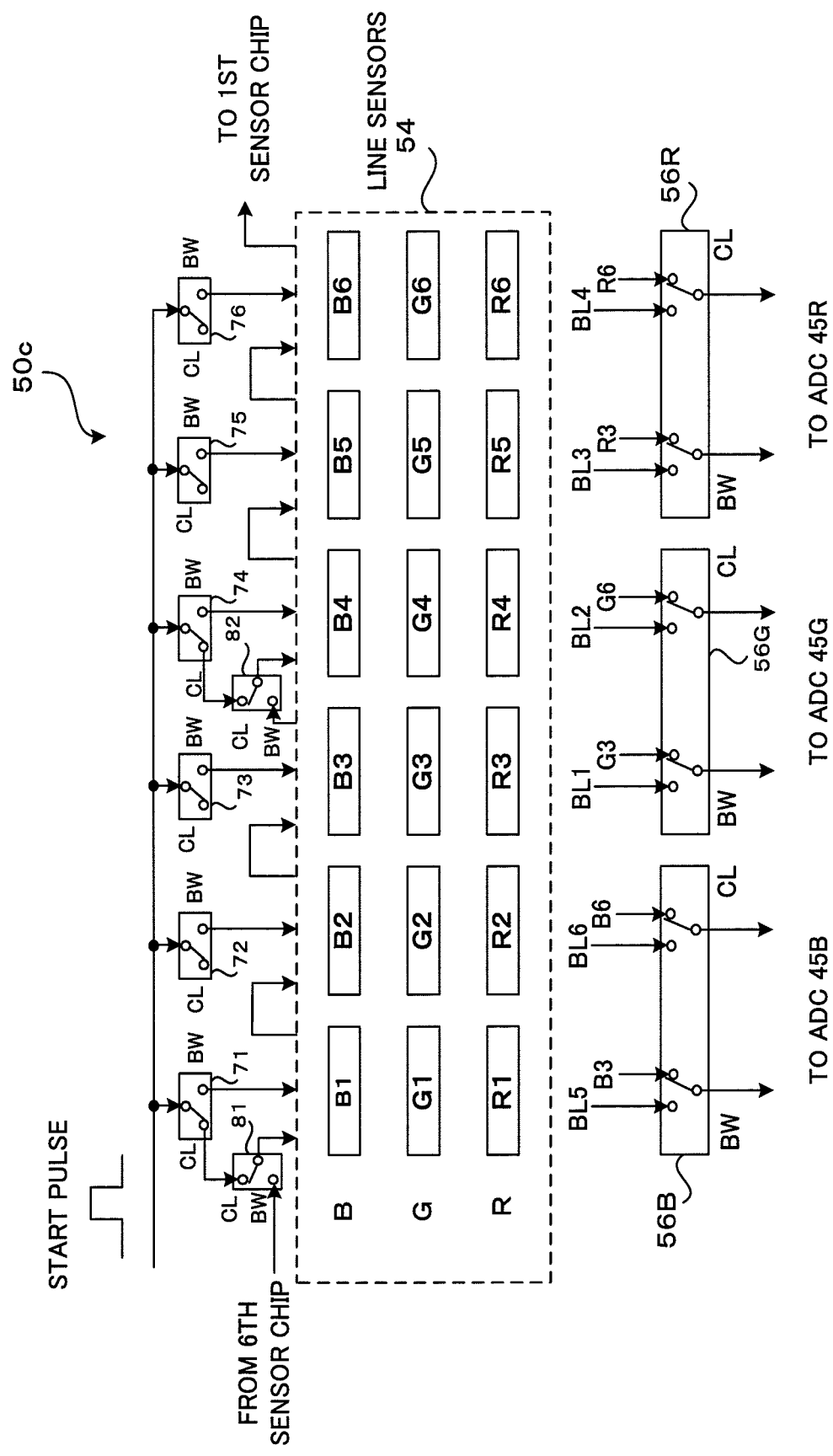
FIG. 17 is a diagram depicting a configuration of an image sensor unit 50c in the image reading apparatus of the third exemplary embodiment of the present invention.

The image reading apparatus of the third exemplary embodiment of the present invention is configured with a signal processing unit 40a which is shown in FIG. 16 and an image sensor unit 50c which is shown in FIG. 17, superseding the signal processing unit 40 and the image sensor unit 50 in the commonly-used image reading apparatus as described already.

As shown in FIG. 16, the signal processing unit 40a in the present exemplary embodiment is made up of ADCs 45B, 45G, 45R, a reordering unit 42, a shading correction/tone correction unit 43, and a pixel interpolation unit 44. In FIG. 16, components corresponding to those shown in FIG. 2 are assigned the same reference labels and their explanation is not repeated.

The ADCs 45B, 45G, 45R are provided for each color of B (blue), G (green), and R (red), respectively. Each A/D converter has the input terminals for two channels (ch1, ch2) and converts analog image data from the image sensor unit 50c into digital image data.

As shown in FIG. 17, the image sensor unit 50c in the present exemplary embodiment is made up of analog switches 71 to 76, 81, 82, line sensors 54, and analog switches 56B, 56G, 56R. In FIG. 17, components corresponding to those shown in FIG. 3 are assigned the same reference labels and their explanation is not repeated.

When the image reading apparatus is placed in the monochrome reading mode, the analog switches 71 to 76 input the start pulse to the center positions of all the first to sixth sensor chips. In the monochrome reading mode, the analog switches 81, 82 make connections between the sixth sensor chip and the first sensor chip and between the third sensor chip and the fourth sensor chip.

Figure 18:
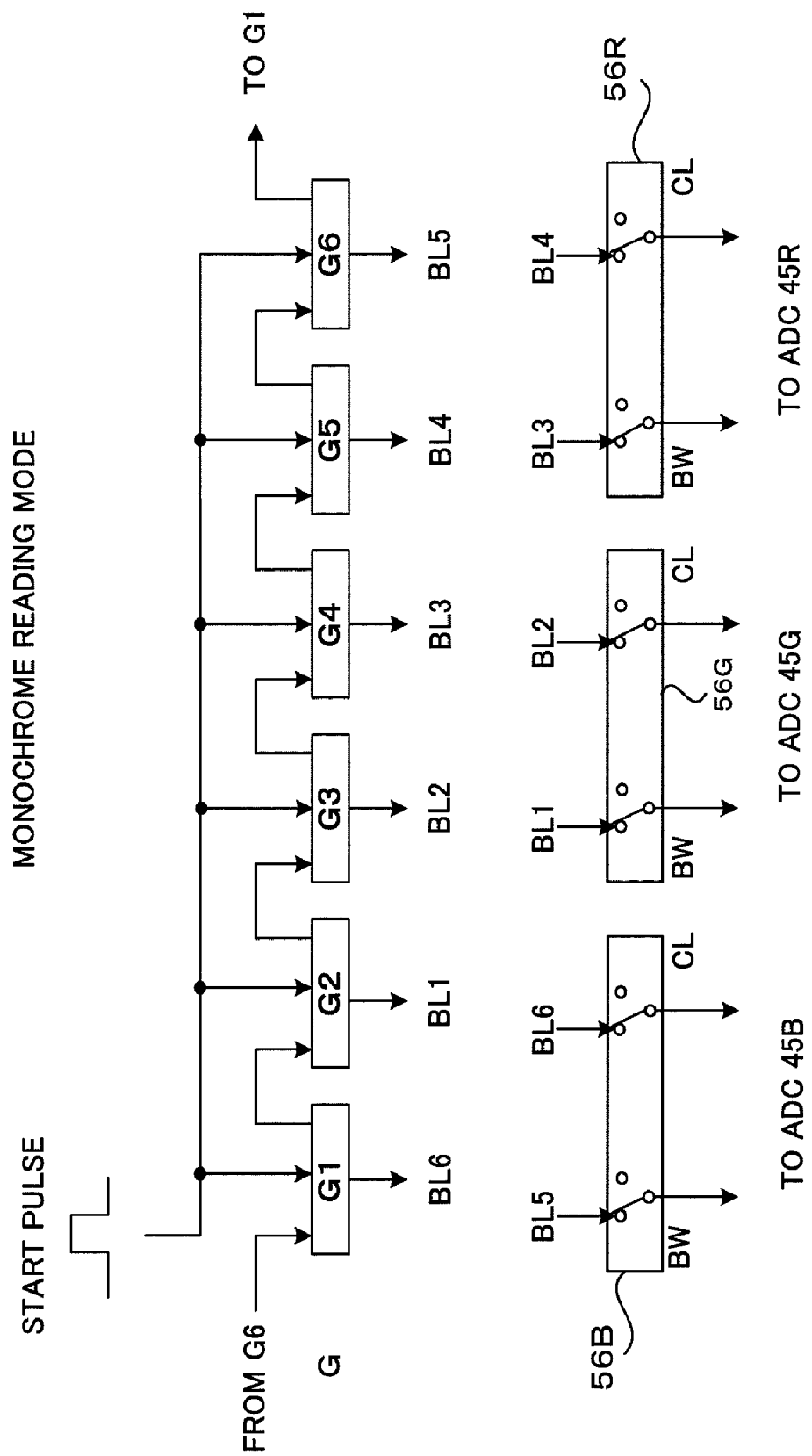
FIG. 18 is a diagram for explaining an outline of wiring when in a monochrome reading mode within the image sensor unit 50c in the image reading apparatus of the third exemplary embodiment of the present invention.

Owing to this configuration, when the image reading apparatus of the present exemplary embodiment is placed in the monochrome reading mode, the analog switches 71 to 76, 81, 82, 56B, 56G, and 56R are placed to BW positions, which results in wiring as shown in FIG. 18.

So, the start pulse is supplied to the center positions of the sensor chips G1 to G6 and the tail of each sensor chip G1 to G6 is connected to the top position of the next sensor chip. Pixel signals taken from near the centers of the sensor chips G1 to G6 are output via the analog switches 56B, 56G, 56R to the input channels of the ADCs 45B, 45G, and 45R, respectively.

Hence, the rear half of the sensor chip G1 and the forward half of the sensor chip G2 are handled as one block (BL1), and the rear half of the sensor chip G2 and the forward half of the sensor chip G3 are handled as one block (BL2). For subsequent chips, similarly, the forward half of the n-th sensor chip and the rear half of the next, (n+1)th sensor chip are handled as one block.

Outputs BL1 and BL2 from the first and second blocks are connected to the input channels (ch1, ch2) of the ADC 45G, outputs BL3 and BL4 from the third and fourth blocks are connected to the input channels (ch1, ch2) of the ADC 45R, and outputs BL5 and BL6 from the fifth and sixth blocks are connected to the input channels (ch1, ch2) of the ADC 45B.

In consequence, as is illustrated in FIG. 19, a concatenation of the pixel signals acquired by the photoelectric transducers in the rear half of the sensor chip G5 and the pixel signals acquired by the photoelectric transducers in the forward half of the sensor chip G6 is output from the first channel of the ADC 45B. A concatenation of the pixel signals acquired by the photoelectric transducers in the rear half of the sensor chip G6 and the pixel signals acquired by the photoelectric transducers in the forward half of the sensor chip G1 is output from the second channel of the ADC 45B.

Likewise, a concatenation of the pixel signals acquired by the photoelectric transducers in the rear half of the sensor chip G1 and the pixel signals acquired by the photoelectric transducers in the forward half of the sensor chip G2 is output from the first channel of the ADC 45G. A concatenation of the pixel signals acquired by the photoelectric transducers in the rear half of the sensor chip G2 and the pixel signals acquired by the photoelectric transducers in the forward half of the sensor chip G3 is output from the second channel of the ADC 45G.

Likewise, a concatenation of the pixel signals acquired by the photoelectric transducers in the rear half of the sensor chip G3 and the pixel signals acquired by the photoelectric transducers in the forward half of the sensor chip G4 is output from the first channel of the ADC 45R. A concatenation of the pixel signals acquired by the photoelectric transducers in the rear half of the sensor chip G4 and the pixel signals acquired by the photoelectric transducers in the forward half of the sensor chip G5 is output from the second channel of the ADC 45R.

These signals are reordered into image data by the data reordering unit 42. The resulting image data in the B color signal processing path is a concatenation of the pixel signals from the rear half of the sensor chip G5, the pixel signals from the sensor chip G6, and the pixel signals from the forward half of the sensor chip G1.

The resulting image data in the G color signal processing path is a concatenation of the pixel signals from the rear half of the sensor chip G1, the pixel signals from the sensor chip G2, and the pixel signals from the forward half of the sensor chip G3. The resulting image data in the R color signal processing path is a concatenation of the pixel signals from the rear half of the sensor chip G3, the pixel signals from the sensor chip G4, and the pixel signals from the forward half of the sensor chip G5.

The pixel interpolation unit 44 performs pixel interpolation on these three image data pieces. Thus, in the B color signal processing path, pixels are interpolated between the pixel signals from the rear half of G5 and the pixel signals from G6. In the G color signal processing path, pixels are interpolated between the pixel signals from the rear half of G1 and the pixel signals from G2 and between the pixel signals from G2 and the pixel signals from the forward half of G3. In the R color signal processing path, pixels are interpolated between the pixel signals from the rear half of G3 and the pixel signals from G4 and between the pixel signals from G4 and the pixel signals from the forward half of G5.

MODIFICATION EXAMPLES

The above-described first and second exemplary embodiments are examples of application of the present invention to the case where two processing paths or lines of processing units (such as ADCs 41G, 41R) are used for processing of pixel signals captured by the six image pickup elements G1 to G6 per color; that is, the number of the processing paths is one third of the number of the image pickup elements. The above-described third exemplary embodiment is an example of application of the present invention to the case where three processing paths or lines of processing units (such as ADCs 45B, 45G, 45R) are used for processing of pixel signals captured by the six image pickup elements G1 to G6 per color; that is, the number of the processing paths is a half of the number of the image pickup elements. However, the present invention is not limited to these cases. The invention can be applied in a similar fashion to any case where the number of processing paths or lines of processing units (such as ADCs 41G, 41R) for processing of pixel signals captured by the six image pickup elements G1 to G6 per color is fewer than the number of the image pickup elements.

The above-described exemplary embodiments are illustrative examples where the present invention is applied to the image reading apparatus; however, the present invention is not so limited. The invention can be applied in a similar fashion to an image forming apparatus such as a copier including an image reading apparatus and an image forming apparatus that outputs an image based on image signals read by the image reading apparatus.

The present invention may be embodied in other specific forms without departing from its spirit or characteristics. The described exemplary embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed is:

1. An image reading apparatus comprising:
   a plurality of image pickup elements which are arranged unidirectionally, each image pickup element including a plurality of photoelectric transducers that convert reflected light from an original document into pixel signals, and a forwarding unit that serially forwards pixel signals acquired by the plurality of photoelectric transducers;
   a dividing unit that divides outputs of the plurality of photoelectric transducers into a plurality of processing paths so that pixel signals acquired by photoelectric transducers located on both sides of a boundary between adjacent image pickup elements are included in the same dividing unit; and
   an interpolation unit that executes pixel interpolation, using the pixel signals acquired by the photoelectric transducers located on both sides of the boundary among the pixel signals divided by the dividing unit.

2. The image reading apparatus according to claim 1, wherein the dividing unit divides the outputs of the plurality of photoelectric transducers so that the pixel signals for at least one pixel from the photoelectric transducers located on both sides of each boundary between adjacent ones of the plurality of image pickup elements are included in a block.

3. The image reading apparatus according to claim 1, wherein the dividing unit divides the outputs of the plurality of photoelectric transducers of each image pickup element into two parts and divides the outputs of the plurality of photoelectric transducers so that the photoelectric transducers in a rear half of an image pickup element and the photoelectric transducers in a forward half of the next image pickup element are grouped into the same processing block.

4. The image reading apparatus according to claim 1, wherein the plurality of image pickup elements include three rows of image pickup elements, each row being provided for each color of red, green, and blue, and the image reading apparatus further comprises:
switching units that switch a reading mode between a color reading state in which image signals of red, green, and blue colors are read using the three rows of image pickup elements and a black-and-white reading state in which image signals are read using any one of the three rows of image pickup elements; and
a plurality of processing units that process the pixel signals divided by the dividing unit separately for each processing path, when the apparatus is placed in the black-and-white reading state by the switching units.

5. The image reading apparatus according to claim 2,
wherein the plurality of image pickup elements include three rows of image pickup elements, each row being provided for each color of red, green, and blue, and
the image reading apparatus further comprises:
switching units that switch a reading mode between a color reading state in which image signals of red, green, and blue colors are read using the three rows of image pickup elements and a black-and-white reading state in which image signals are read using any one of the three rows of image pickup elements; and
a plurality of processing units that process the pixel signals divided by the dividing unit separately for each processing path, when the apparatus is placed in the black-and-white reading state by the switching units.

6. The image reading apparatus according to claim 3,
wherein the plurality of image pickup elements include three rows of image pickup elements, each row being provided for each color of red, green, and blue, and
the image reading apparatus further comprises:
switching units that switch a reading mode between a color reading state in which image signals of red, green, and blue colors are read using the three rows of image pickup elements and a black-and-white reading state in which image signals are read using any one of the three rows of image pickup elements; and
a plurality of processing units that process the pixel signals divided by the dividing unit separately for each processing path, when the apparatus is placed in the black-and-white reading state by the switching units.

7. An image forming apparatus comprising:
a plurality of image pickup elements which are arranged unidirectionally, each image pickup element including a plurality of photoelectric transducers that convert reflected light from an original document into pixel signals, and a forwarding unit that serially forwards pixel signals acquired by the plurality of photoelectric transducers;
a dividing unit that divides outputs of the plurality of photoelectric transducers into a plurality of processing paths so that pixel signals acquired by photoelectric transducers located on both sides of a boundary between adjacent image pickup elements are included in the same dividing unit;
an interpolation unit that executes pixel interpolation, using the pixel signals acquired by the photoelectric transducers located on both sides of the boundary among the pixel signals divided by the dividing unit; and
an output unit that outputs an image based on image signals interpolated with pixels by the interpolation unit.

8. The image forming apparatus according to claim 7, wherein the dividing unit divides the outputs of the plurality of photoelectric transducers so that the pixel signals for at least one pixel from the photoelectric transducers located on both sides of each boundary between adjacent ones of the plurality of image pickup elements are included in a block.

9. The image forming apparatus according to claim 7, wherein the dividing unit divides the outputs of the plurality of photoelectric transducers of each image pickup element into two parts and divides the outputs of the plurality of photoelectric transducers so that the photoelectric transducers in a rear half of an image pickup element and the photoelectric transducers in a forward half of the next image pickup element are grouped into the same processing block.

10. The image forming apparatus according to claim 7,
wherein the plurality of image pickup elements include three rows of image pickup elements, each row being provided for each color of red, green, and blue, and
the image forming apparatus further comprises:
switching units that switch a reading mode between a color reading state in which image signals of red, green, and blue colors are read using the three rows of image pickup elements and a black-and-white reading state in which image signals are read using any one of the three rows of image pickup elements; and
a plurality of processing units that process the pixel signals divided by the dividing unit separately for each processing path, when the apparatus is placed in the black-and-white reading state by the switching units.

11. A non-transitory computer readable medium storing a program including instructions causing a computer to perform a process comprising:
in handling of a plurality of image pickup elements which are arranged unidirectionally, each image pickup element including a plurality of photoelectric transducers that convert reflected light from an original document into pixel signals, and a forwarding unit that serially forwards pixel signals acquired by the plurality of photoelectric transducers,
dividing, in a dividing unit, outputs of the plurality of photoelectric transducers into a plurality of processing paths so that pixel signals acquired by photoelectric transducers located on both sides of a boundary between adjacent image pickup elements are included in the same dividing unit; and
executing pixel interpolation, using the pixel signals acquired by the photoelectric transducers located on both sides of the boundary among the pixel signals divided.

12. The non-transitory computer readable medium storing a program according to claim 11, wherein the dividing process divides the outputs of the plurality of photoelectric transducers so that the pixel signals for at least one pixel from the photoelectric transducers located on both sides of each boundary between adjacent ones of the plurality of image pickup elements are included in a block.

13. The non-transitory computer readable medium storing a program according to claim 11, wherein the dividing process divides the outputs of the plurality of photoelectric transducers of each image pickup element into two parts and divides the outputs of the plurality of photoelectric transducers so that the photoelectric transducers in a rear half of an image pickup element and the photoelectric transducers in a forward half of the next image pickup element are grouped into the same processing block.

14. The non-transitory computer readable medium storing a program according to claim 11,
wherein the plurality of image pickup elements include three rows of image pickup elements, each row being provided for each color of red, green, and blue, and
the computer readable medium storing a program further causing a computer to perform a process comprises:

switching a reading mode between a color reading state in which image signals of red, green, and blue colors are read using the three rows of image pickup elements and a black-and-white reading state in which image signals are read using any one of the three rows of image pickup elements; and processing the pixel signals divided by the dividing unit separately for each processing path, when an apparatus comprising the plurality of image pickup elements is placed in the black-and-white reading state in response to the switching.

15. An image reading method comprising:

in handling of a plurality of image pickup elements which are arranged unidirectionally, each image pickup element including a plurality of photoelectric transducers that convert reflected light from an original document into pixel signals, and a forwarding unit that serially forwards pixel signals acquired by the plurality of photoelectric transducers, dividing, in a dividing unit, outputs of the plurality of photoelectric transducers into a plurality of processing paths so that pixel signals acquired by photoelectric transducers located on both sides of a boundary between adjacent image pickup elements are included in the same dividing unit; and executing pixel interpolation, using the pixel signals acquired by the photoelectric transducers located on both sides of the boundary among the pixel signals divided.

16. The image reading method according to claim 15, wherein the dividing further comprises dividing the outputs of the plurality of photoelectric transducers so that the pixel signals for at least one pixel from the photoelectric transducers located on both sides of each boundary between adjacent ones of the plurality of image pickup elements are included in a block.

17. The image reading method according to claim 15, wherein the dividing further comprises dividing the outputs of the plurality of photoelectric transducers of each image pickup element into two parts and divides the outputs of the plurality of photoelectric transducers so that the photoelectric transducers in a rear half of an image pickup element and the photoelectric transducers in a forward half of the next image pickup element are grouped into the same processing block.

18. The image reading method according to claim 15, wherein the plurality of image pickup elements include three rows of image pickup elements, each row being provided for each color of red, green, and blue, and the image reading method further comprises:

switching a reading mode between a color reading state in which image signals of red, green, and blue colors are read using the three rows of image pickup elements and a black-and-white reading state in which image signals are read using any one of the three rows of image pickup elements; and processing the pixel signals divided by the dividing unit separately for each processing path, when an apparatus comprising the plurality of image pickup elements is placed in the black-and-white reading state in response to the switching.

* * * * *